US012100547B2

(12) United States Patent
Aita et al.

(10) Patent No.: US 12,100,547 B2
(45) Date of Patent: Sep. 24, 2024

(54) POWER STORAGE DEVICE, POWER STORAGE DEVICE ELECTRODE, AND A METHOD FOR MANUFACTURING SAID POWER STORAGE DEVICE AND POWER STORAGE DEVICE ELECTRODE

(71) Applicant: Musashi Energy Solutions Co., Ltd., Hokuto (JP)

(72) Inventors: Kazunari Aita, Minato-ku (JP); Hiroki Yakushiji, Minato-ku (JP); Hirobumi Suzuki, Minato-ku (JP); Tomohiro Utaka, Minato-ku (JP); Masaya Naoi, Minato-ku (JP); Kenji Kojima, Minato-ku (JP)

(73) Assignee: Musashi Energy Solutions Co., Ltd., Hokuto (JP)

( * ) Notice: Subject to any disclaimer, the term of this patent is extended or adjusted under 35 U.S.C. 154(b) by 951 days.

(21) Appl. No.: 16/975,001

(22) PCT Filed: Feb. 21, 2019

(86) PCT No.: PCT/JP2019/006576
§ 371 (c)(1),
(2) Date: Aug. 21, 2020

(87) PCT Pub. No.: WO2019/163896
PCT Pub. Date: Aug. 29, 2019

(65) Prior Publication Data
US 2021/0090818 A1 Mar. 25, 2021

(30) Foreign Application Priority Data

Feb. 22, 2018 (JP) .................................. 2018-029678
Apr. 9, 2018 (JP) .................................. 2018-074725

(51) Int. Cl.
*H01G 11/06* (2013.01)
*H01G 11/50* (2013.01)
(Continued)

(52) U.S. Cl.
CPC ............. *H01G 11/06* (2013.01); *H01G 11/50* (2013.01); *H01G 11/52* (2013.01); *H01G 11/66* (2013.01);
(Continued)

(58) Field of Classification Search
CPC ..... H01M 2004/027; H01M 2004/021; H01M 10/0525; H01M 4/80; H01M 4/366;
(Continued)

(56) References Cited

U.S. PATENT DOCUMENTS

2004/0179328 A1* 9/2004 Ando ..................... H01G 11/12
361/504
2007/0002524 A1 1/2007 Ando et al.
(Continued)

FOREIGN PATENT DOCUMENTS

CN 102881860 A 1/2013
JP 2001-236945 A 8/2001
(Continued)

OTHER PUBLICATIONS

Decision of Refusal issued on Apr. 11, 2023 in the corresponding Japanese Patent Application No. 2020-501034 (with unedited computer-generated English translation), 6 pages.
(Continued)

*Primary Examiner* — Nathan Milakovich
(74) *Attorney, Agent, or Firm* — Oblon, McClelland, Maier & Neustadt, L.L.P.

(57) ABSTRACT

A power storage device includes: an electrode assembly, including a positive electrode, a separator, and a negative electrode; and an electrolyte solution. The negative elec-
(Continued)

trode includes a negative electrode current collector, and a negative electrode active material layer formed on a surface of the negative electrode current collector. The negative electrode is doped with lithium. The power storage device includes first through-holes penetrating the negative electrode current collector in a thickness direction thereof. On at least one side of the negative electrode current collector, the power storage device includes second through-holes penetrating the negative electrode active material layer in a thickness direction thereof. An aperture ratio of the first through-holes on the negative electrode current collector, or an aperture ratio of the second through-holes on the negative electrode active material layer is 0.001% or higher and 1% or lower.

8 Claims, 6 Drawing Sheets

(51) Int. Cl.

| | |
|---|---|
| *H01G 11/52* | (2013.01) |
| *H01G 11/66* | (2013.01) |
| *H01G 11/86* | (2013.01) |
| *H01M 4/02* | (2006.01) |
| *H01M 4/134* | (2010.01) |
| *H01M 4/36* | (2006.01) |
| *H01M 4/80* | (2006.01) |
| *H01M 10/0525* | (2010.01) |

(52) U.S. Cl.
CPC ............ *H01G 11/86* (2013.01); *H01M 4/134* (2013.01); *H01M 4/366* (2013.01); *H01M 4/80* (2013.01); *H01M 10/0525* (2013.01); *H01M 2004/021* (2013.01); *H01M 2004/027* (2013.01)

(58) Field of Classification Search
CPC ....... H01M 4/134; H01G 11/50; H01G 11/52; H01G 11/66; H01G 11/86
See application file for complete search history.

(56) References Cited

U.S. PATENT DOCUMENTS

| | | | | |
|---|---|---|---|---|
| 2011/0281142 A1* | 11/2011 | He | ........................ | H01M 4/13 |
| | | | | 429/7 |
| 2011/0281143 A1* | 11/2011 | He | ........................ | H01M 4/13 |
| | | | | 429/7 |
| 2011/0281152 A1* | 11/2011 | He | ........................ | H01M 4/742 |
| | | | | 429/159 |
| 2019/0074143 A1* | 3/2019 | Naoi | ................. | H01M 10/0587 |
| 2019/0198854 A1* | 6/2019 | Sumiya | ................. | H01M 4/587 |
| 2021/0159484 A1* | 5/2021 | Yakushiji | ............ | H01M 4/0416 |
| 2022/0320482 A1* | 10/2022 | Miyauchi | ............... | H01G 11/86 |

FOREIGN PATENT DOCUMENTS

| | | | | | |
|---|---|---|---|---|---|
| JP | 2004-266091 | A | | 9/2004 | |
| JP | 101015075 | A | | 8/2007 | |
| JP | 4015993 | B2 | | 9/2007 | |
| JP | 2011-159642 | A | | 8/2011 | |
| JP | 2011-210995 | A | | 10/2011 | |
| JP | 2012-4491 | A | | 1/2012 | |
| JP | 2013-20820 | A | | 1/2013 | |
| JP | 2016-58375 | A | | 4/2016 | |
| JP | 2016058375 | A | * | 4/2016 | |
| JP | 2018074117 | A | * | 5/2018 | ............ H01G 11/06 |
| WO | WO 2005/031773 | A1 | | 4/2005 | |
| WO | WO-2015107893 | A1 | * | 7/2015 | ............ H01G 11/06 |
| WO | WO 2017/146223 | A1 | | 8/2017 | |
| WO | WO-2017188388 | A1 | * | 11/2017 | ............ H01G 11/06 |

OTHER PUBLICATIONS

Decision of Dismissal of Amendment issued on Apr. 11, 2023 in the corresponding Japanese Patent Application No. 2020-501034 (with unedited computer-generated English translation), 2 pages.
Combined Chinese Office Action and Search Report issued Aug. 27, 2021 in Patent Application No. 201980014852.7 (with English machine translation), 15 pages.
International Preliminary Report on Patentability and Written Opinion issued Sep. 3, 2020 in PCT/JP2019/006576 (submitting English translation only), 8 pages.
Combined Chinese Office Action and Search Report issued Feb. 11, 2022 in corresponding Chinese Patent Application No. 201980014852.7 (with English Translation and English Translation of Category of Cited Documents), 13 pages.
Extended European Search Report issued Nov. 9, 2021 in European Patent Application No. 19757859.4, 10 pages.
International Search Report issued on May 14, 2019 in PCT/JP2019/006576 filed on Feb. 21, 2019, 1 page.
Written Opinion issued on May 14, 2019 in PCT/JP2019/006576 filed on Feb. 21, 2019, 4 pages (no translation).
Japanese Office Action issued Nov. 15, 2022 in Japanese Patent Application No. 2020-501034 (with unedited computer generated English Translation), 8 pages.
Office Action issued May 31, 2022, in corresponding Japanese Patent Application No. 2020-501034 (with English Translation), 6 pages.

* cited by examiner

US 12,100,547 B2

POWER STORAGE DEVICE, POWER STORAGE DEVICE ELECTRODE, AND A METHOD FOR MANUFACTURING SAID POWER STORAGE DEVICE AND POWER STORAGE DEVICE ELECTRODE

CROSS-REFERENCE TO RELATED APPLICATIONS

This international application claims the benefit of Japanese Patent Applications No. 2018-029678 filed on Feb. 22, 2018 and No. 2018-074725 filed on Apr. 9, 2018 with the Japan Patent Office and the entire disclosures of Japanese Patent Applications No. 2018-029678 and No. 2018-074725 are incorporated in the present international application by reference.

TECHNICAL FIELD

The present disclosure relates to a power storage device, a power storage device negative electrode, and a method for manufacturing the power storage device and the power storage device negative electrode.

BACKGROUND ART

In recent years, hybrid capacitors have a high profile. Hybrid capacitors are power storage devices made by a combination of power storing principles for lithium ion rechargeable batteries and for electrical double layer capacitors. A hybrid capacitor is disclosed in Patent Document 1. Also, an organic electrolytic capacitor is disclosed in Patent Document 2.

PRIOR ART DOCUMENTS

Patent Documents

Patent Document 1: Official Gazette of Japanese Patent No. 4015993
Patent Document 2: Pamphlet of WO2005/031773

SUMMARY OF THE INVENTION

Problems to be Solved by the Invention

The hybrid capacitor described in Patent Document 1 is poor in cycle characteristics. The organic electrolytic capacitor described in Patent Document 2 is low in energy density. In general, cycle characteristics and an energy density are in a tradeoff relation, and thus improving the both has been difficult.

It is desirable that one aspect of the present disclosure provides a power storage device and a power storage device negative electrode with good cycle characteristics and high energy densities, and also provides a method for manufacturing such a power storage device and a power storage device negative electrode.

Means for Solving the Problems

One aspect of the present disclosure provides a power storage device comprising: an electrode assembly, comprising a positive electrode, a separator, and a negative electrode; and an electrolyte solution. The negative electrode comprises a negative electrode current collector, and a negative electrode active material layer formed on a surface of the negative electrode current collector. The negative electrode is doped with lithium. The power storage device comprises first through-holes penetrating the negative electrode current collector in a thickness direction thereof. On at least one side of the negative electrode current collector, the power storage device comprises second through-holes penetrating the negative electrode active material layer in a thickness direction thereof. An aperture ratio of the first through-holes on the negative electrode current collector, or an aperture ratio of the second through-holes on the negative electrode active material layer is 0.001% or higher and 1% or lower.

The power storage device that is one aspect of the present disclosure is high in energy density and good in cycle characteristics.

Another aspect of the present disclosure provides a power storage device negative electrode comprising: a negative electrode current collector; and a negative electrode active material layer formed on a surface of the negative electrode current collector. The power storage device negative electrode is doped with lithium. The power storage device negative electrode comprises first through-holes penetrating the negative electrode current collector in a thickness direction thereof. On at least one side of the negative electrode current collector, the power storage device negative electrode comprises second through-holes penetrating the negative electrode active material layer in a thickness direction thereof. An aperture ratio of the first through-holes on the negative electrode current collector, or an aperture ratio of the second through-holes on the negative electrode active material layer is 0.001% or higher and 1% or lower.

The power storage device can be manufactured using the power storage device negative electrode which is another aspect of the present disclosure. The manufactured power storage device is high in energy density and good in cycle characteristics.

Another aspect of the present disclosure provides a method for manufacturing a power storage device negative electrode including: a negative electrode current collector; and a negative electrode active material layer formed on a surface of the negative electrode current collector. The power storage device negative electrode is doped with lithium. The negative electrode current collector includes first through-holes penetrating the negative electrode current collector in a thickness direction thereof. The negative electrode active material layer comprises, on at least one side of the negative electrode current collector, second through-holes penetrating the negative electrode active material layer in a thickness direction thereof. An aperture ratio of the first through-holes on the negative electrode current collector, or an aperture ratio of the second through-holes on the negative electrode active material layer is 0.001% or higher and 1% or lower. The method comprises a process of doping the negative electrode with lithium.

In accordance with another aspect of the present disclosure, the power storage device negative electrode can be manufactured. With the manufactured power storage device negative electrode, the power storage device can be manufactured. The manufactured power storage device is high in energy density and good in cycle characteristics.

Another aspect of the present disclosure provides a power storage device comprising: an electrode assembly, comprising a positive electrode, a separator, and a negative electrode; and an electrolyte solution. The negative electrode comprises a negative electrode current collector, and a negative electrode active material layer formed on at least one side of the negative electrode current collector. The negative electrode is doped with lithium. An aperture ratio of the negative electrode current collector is 0% or higher and 0.1% or lower. The negative electrode active material layer comprises holes. An aperture ratio of the negative electrode active material layer is 0.001% or higher and 10% or lower.

The power storage device that is another aspect of the present disclosure is high in energy density and good in cycle characteristics.

Another aspect of the present disclosure provides a power storage device negative electrode comprising: a negative electrode current collector; and a negative electrode active material layer formed on a surface of the negative electrode current collector. The power storage device negative electrode is doped with lithium. An aperture ratio of the negative electrode current collector is 0% or higher and 0.1% or lower. The negative electrode active material layer comprises holes. An aperture ratio of the negative electrode active material layer is 0.001% or higher and 1% or lower.

The power storage device can be manufactured using the power storage device negative electrode which is another aspect of the present disclosure. The manufactured power storage device is high in energy density and good in cycle characteristics.

Another aspect of the present disclosure provides a method for manufacturing a power storage device negative electrode including: a negative electrode current collector; and a negative electrode active material layer formed on at least one side of the negative electrode current collector. The power storage device negative electrode is doped with lithium. An aperture ratio of the negative electrode current collector is 0% or higher and 0.1% or lower. The negative electrode active material layer includes holes. An aperture ratio of the negative electrode active material layer is 0.001% or higher 10% or lower. The method comprises doping of the negative electrode with lithium.

In accordance with another aspect of the present disclosure, the power storage device negative electrode can be manufactured. With the manufactured power storage device negative electrode, the power storage device can be manufactured. The manufactured power storage device is high in energy density and good in cycle characteristics.

Another aspect of the present disclosure provides a method for manufacturing a power storage device including an electrode cell. The method comprises sequentially stacking: a power storage device negative electrode manufactured by a method for manufacturing a power storage device negative electrode according to another aspect of the present disclosure; a separator; and an electrode that is different from the power storage device negative electrode in order to form the electrode cell.

In accordance with another aspect of the present disclosure, the power storage device can be manufactured. The manufactured power storage device is high in energy density and good in cycle characteristics.

EXPLANATION OF REFERENCE NUMERALS

Figure 1:
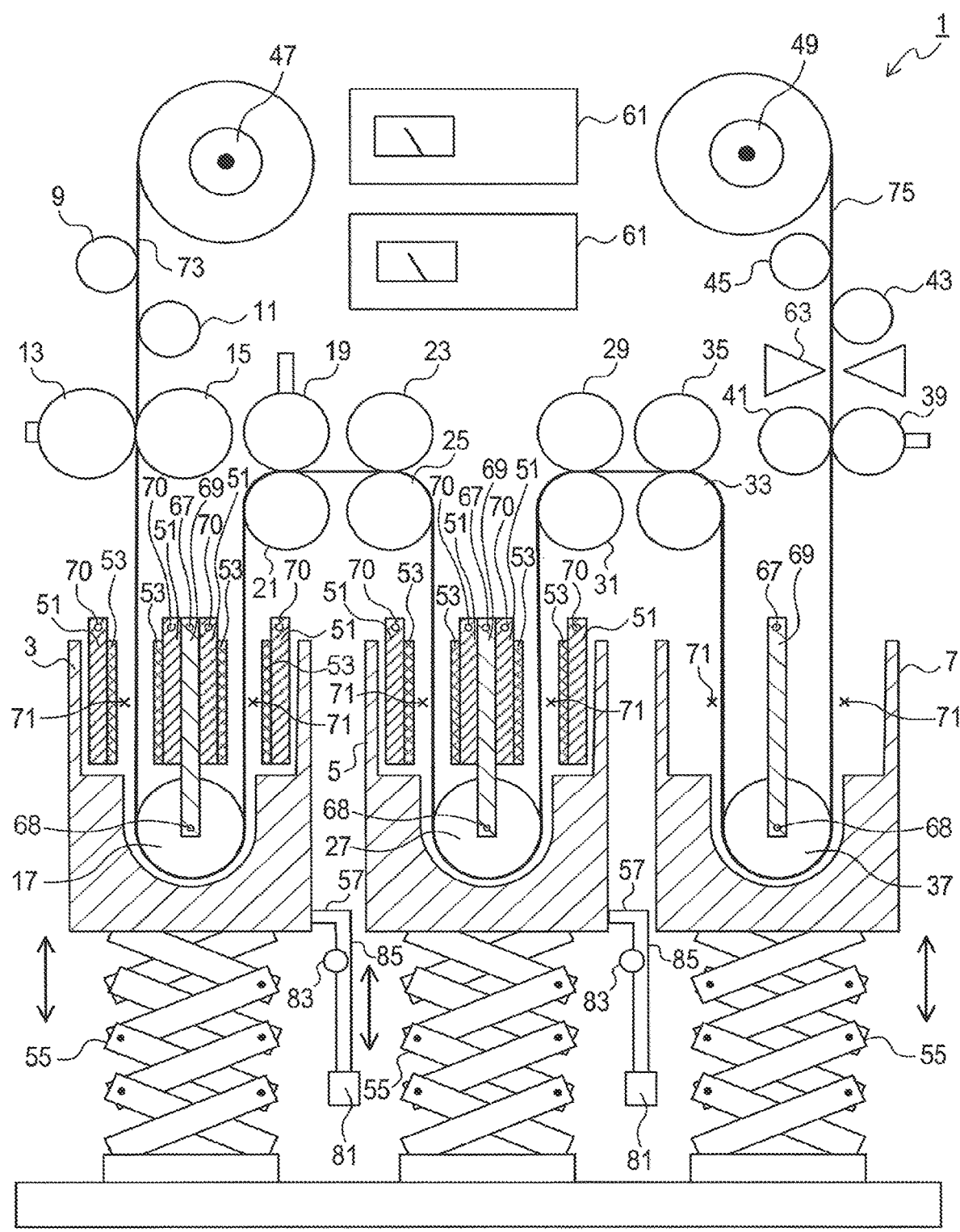
FIG. 1 is an explanatory diagram showing a configuration of an electrode manufacturing apparatus.

1 . . . electrode manufacturing apparatus, 3, 5 . . . electrolyte solution tank, 7 . . . cleaning tank, 9, 11, 13, 15, 17, 19, 21, 23, 25, 27, 29, 31, 33, 35, 37, 39, 41, 43, 45 . . . conveyor roller, 47 . . . supply roll, 49 . . . wind-up roll, 51 . . . counter electrode member, 53 . . . porous insulating member, 55 . . . supporting table, 57 . . . circulating filter, 61 . . . direct current power source, 63 . . . blower, 67, 68 . . . supporting rod, 69 . . . partition plate, 70 . . . supporting rod, 71 . . . space, 73 . . . electrode precursor, 75 . . . power storage device negative electrode, 81 . . . filter, 83 . . . pump, 85 . . . piping, 93 . . . negative electrode current collector, 95 . . . negative-electrode active material layer, 97 . . . first through-hole, 99 . . . second through-hole, 199 . . . hole

MODE FOR CARRYING OUT THE INVENTION

Example embodiments of the present disclosure will be described with reference to the drawings.

First Embodiment

1. Power Storage Device (1-1) Overall Structure of Power Storage Device

A power storage device according to the present disclosure comprises an electrode assembly and an electrolyte solution. The electrode assembly comprises a positive electrode, a separator, and a negative electrode. The negative electrode comprises a negative electrode current collector and a negative electrode active material layer. The negative electrode active material layer is formed on the surface of the negative electrode current collector. The negative electrode is doped with lithium. The negative electrode current collector comprises first through-holes penetrating the negative electrode current collector in a direction of the thickness of the negative electrode current collector. On at least one side of the negative electrode current collector, the negative electrode active material layer comprises second through-holes penetrating the negative electrode active material layer in a direction of the thickness of the negative electrode active material layer. The aperture ratio of the first through-holes on the negative electrode current collector or the aperture ratio of the second through-holes on the negative electrode active material layer is 0.001% or more and 1% or less.

In the present specification, "positive electrode" means an electrode disposed on a side from which an electric current flows out during discharging, and into which an electric current flows during charging. In the present specification, "negative electrode" means an electrode disposed on a side into which an electric current flows during discharging, and from which an electric current flows out during charging.

In the present specification, "doped with lithium" means a state in which lithium is occluded, intercalated, adsorbed, carried, alloyed, or inserted in various types of state, such as a metallic state, an ionic state, a state of compound. Examples of being "doped" includes a phenomenon in which at least one of lithium and anions enter a positive electrode active material, and a phenomenon in which lithium ions enter the negative electrode active material. "Dedoping" means removal and release. Examples of "dedoping" includes a phenomenon in which lithium ions or anion are removed from the positive electrode active material, and a phenomenon in which lithium ions are removed from the negative electrode active material.

In the power storage device according to the present disclosure, it is preferable that at least one of the negative electrode and the positive electrode is doped with lithium in advance. In the power storage device according to the present disclosure, it is more preferable that the negative electrode is doped with lithium in advance.

An example of a method for doping at least one of the negative electrode and the positive electrode with lithium in advance may be a method in which a lithium electrode is disposed in the power storage device, and at least one of the negative electrode and the positive electrode is brought into electrochemical contact with the lithium electrode to be doped with lithium. The lithium electrode includes metal lithium.

An example of another method for doping at least one of the negative electrode and the positive electrode with lithium in advance may be a method in which the lithium electrode is locally disposed in a cell and the lithium electrode is brought into electrochemical contact with at least one of the negative electrode and the positive electrode. According to this method, at least one of the negative electrode and the positive electrode can be uniformly doped with lithium.

The power storage device according to the present disclosure can be manufactured as follows, for example. The positive electrode is manufactured by forming the positive electrode active material layer on the surface of the positive electrode current collector. The positive electrode current collector comprises, for example, holes (hereinafter referred to as third through-holes) penetrating the positive electrode current collector in a thickness direction thereof.

The negative electrode is manufactured by forming the negative electrode active material layer on the surface of the negative electrode current collector. The negative electrode current collector comprises the first through-holes penetrating the negative electrode current collector in a thickness direction thereof. On at least one side of the negative electrode current collector, the negative electrode active material layer comprises the second through-holes penetrating the negative electrode active material layer in a thickness direction thereof.

The positive electrode, a first separator, the negative electrode, and a second separator are stacked in this order to form a laminate. The laminate is, for example, three or more stacked units, and each unit includes the positive electrode, the first separator, the negative electrode, and the second separator. Examples of the form of the laminate include plate-like, sheet-like, and wounded forms. In an excess portion of the first separator, at least one lithium electrode is disposed. The lithium electrode and the positive electrode are arranged not to contact with each other. The negative electrode current collector and the lithium electrode are short circuited. Through the above processes, the electrode assembly is completed.

The electrode assembly is sealed in an outer container. Examples of the form of the outer container include rectangular, cylindrical, and laminated forms. The outer container may be a film or a can. Subsequently, the outer container is filled with the electrolyte solution. At this time, doping of the negative electrode active material layer with lithium from the lithium electrode is initiated. Consequently, the inside of the negative electrode active material layers is doped with lithium. Through the above processes, the power storage device is completed.

The power storage device according to the present disclosure comprises a structure basically similar to that of the power storage device described in, for example, Japanese Unexamined Patent Application Publication No. 2004-266091.

(1-2) Specific Example of Power Storage Device

Specific examples of the power storage device according to the present disclosure include lithium ion capacitors and lithium ion rechargeable batteries. The power storage device is preferably a lithium ion capacitor.

In the present specification, the lithium ion capacitor means a power storage device comprising a polarizable electrode as the positive electrode and a non-polarizable electrode as the negative electrode, and containing lithium ions.

The material for the positive electrode of the lithium ion capacitor is preferably a material having a large specific surface area such as activated carbon and polyacene. Examples of the material for the negative electrode include carbon material, metal oxide, and metal alloy. Examples of the carbon material include graphite-based composite particles and polyacene-based organic semiconductors (PAS).

The graphite-based composite particles each comprise a core particle and a graphitized substance covering the surface of the core particle. Examples of the core particle include graphite, hardly graphitizable carbon, and natural graphite. Examples of the graphitized substance include graphitized substances deriving from tar or pitch.

The polyacene-based organic semiconductors are heat treated substances of aromatic condensation polymer. The polyacene-based organic semiconductors have a polyacene-type skeletal structure. In the polyacene-type skeletal structure, the atomic ratio between hydrogen atoms and carbon atoms is 0.05 to 0.50. The atomic ratio between hydrogen atoms and carbon atoms is a value in which the number of carbon atoms is a denominator and the number of hydrogen atoms is a numerator.

An example of the metal oxide may be lithium titanate. Examples of the metal alloy include silicon and tin.

The negative electrode of the lithium ion capacitor is preferably the negative electrode doped with lithium in advance. If the negative electrode is the negative electrode doped with lithium in advance, use of the lithium ion capacitor can be started by a charging operation. The energy density of the lithium ion capacitor is preferably 31.5 Wh/L or higher, and further preferably 33 Wh/L or higher.

In the present specification, the lithium ion rechargeable battery means a power storage device in which the positive electrode and the negative electrode are non-polarizable electrodes, and lithium ions are contained. The material for the positive electrode of the lithium ion rechargeable battery is preferably transition metal complex oxide and the like of lithium cobalt oxide, lithium iron phosphate, and so on. The material for the negative electrode is preferably graphite, carbonaceous material such as hardly graphitizable carbon, metal oxide such as lithium titanate, and metal alloy containing, for example, silicon or tin.

(1-3) Current Collector

In the present specification, "current collector" means both of the positive electrode current collector and the negative electrode current collector. The positive electrode comprises the positive electrode current collector that receives and distributes electricity. The negative electrode comprises the negative electrode current collector that receives and distributes electricity.

The negative electrode current collector comprises the first through-holes penetrating the negative electrode current collector in the thickness direction. The positive electrode current collector preferably comprises the third through-holes penetrating the positive electrode current collector in the thickness direction.

The forms and the numbers of the first through-holes and the third through-holes are not particularly limited. The forms, numbers, and so on of the first through-holes and the third through-holes can be set, for example, such that lithium ions that are electrochemically supplied from the lithium electrode, disposed to face at least one of the positive electrode and the negative electrode, or lithium ions that are in the electrolyte solution can move between the front and the back of the electrode without being interrupted by the current collector.

(1-4) Positive Electrode Current Collector

An example of the positive electrode current collector may be a positive electrode current collector comprising the third through-holes. An example of the positive electrode current collector comprising the third through-holes may be porous current collectors. Examples of the positive electrode current collectors with the third through-holes include expanded metal and punched metal. The third through-holes of the expanded metal, the punched metal, and so on can be made by, for example, mechanical punching.

The third through-holes can be made by a method such as laser processing, etching, and electrolytic etching. Examples of the laser used for the laser processing include $CO_2$ laser, YAG laser, and UV laser.

Examples of the material for the positive current collector include aluminum and stainless steel. The material for the positive current collector is preferably aluminum. The thickness of the positive electrode current collector is not particularly limited, but preferably in the range of 1 μm or larger and 50 μm or smaller, more preferably in the range of 5 μm or larger and 40 μm or smaller, and particularly preferably in the range of 10 μm or larger and 40 μm or smaller.

The aperture ratio of the third through-holes on the positive current collector (hereinafter referred to as third through-hole aperture ratio) (%) is preferably 20% or more and 50% or less, and more preferably 20% or more and 40% or less. The third through-hole aperture ratio (%) can be obtained by Formula (1) below.

Third through-hole aperture ratio (%)=[1−(mass of positive electrode current collector/absolute specific gravity of positive electrode current collector)/(apparent volume of positive electrode current collector)]×100   Formula (1):

(1-5) Positive Electrode Active Material

For the positive electrode active material, a substance that can allow reversible doping and dedoping with at least one type of anions, such as lithium and tetrafluoroborate, is used. An example of the positive electrode active material may be activated carbon powder. The specific surface area of the activated carbon is preferably 1900 $m^2/g$ or larger and 3000 $m^2/g$ or smaller, and further preferably 1950 $m^2/g$ or larger and 2800 $m^2/g$ or smaller. The cumulative diameter for 50% (D50) of the volume of the activated carbon is preferably, from the aspect of the filling density of the activated carbon, 2 μm or larger and 8 μm or smaller, and particularly preferably 2 μm or larger and 5 μm or smaller. If the specific surface area and the 50% volume cumulative diameter (D50) of the activated carbon are respectively within the above ranges, the energy density of the power storage device is further improved. The value of the 50% volume cumulative diameter (D50) is a value obtained by the micro-track method.

(1-6) Positive Electrode Active Material Layer

The positive electrode active material layer is formed by attaching the positive electrode active material to the positive electrode current collector. Examples of a method for attaching the positive electrode active material include coating, printing, injecting, spraying, vapor deposition, and pressure bonding. The thickness of the positive electrode active material layer on one side of the positive electrode current collector is preferably 55 μm or larger and 95 μm or smaller, more preferably 60 μm or larger and 90 μm or smaller, particularly preferably 65 μm or larger and 80 μm or smaller. If the thickness of the positive electrode active material layer is within the above ranges, the diffusion resistance of the ions moving in the positive electrode active material layer becomes small. Thus, the internal resistance of the power storage device decreases. Moreover, if the thickness of the positive electrode active material layer is within the above ranges, the capacity of the positive electrode can be increased, thus increasing the cell capacity. Consequently, the capacity of the power storage device increases.

The electrode density of the positive electrode active material layer is preferably 0.1 $g/cm^3$ or higher and 5 $g/cm^3$ or lower, more preferably 0.2 $g/cm^3$ or higher and 3 $g/cm^3$ or lower, and particularly preferably 0.3 $g/cm^3$ or higher and 2 $g/cm^3$ or lower. If the electrode density of the positive electrode active material layer is within the above ranges, the energy density of the power storage device increases, which improves the cycle characteristics of the power storage device.

The electrode density of the positive electrode active material layer can be measured by the following method. The power storage device is disassembled to obtain the positive electrode. The obtained positive electrode undergoes a cleaning process with diethyl carbonate and is vacuum dried at 100° C. The mass of the positive electrode active material layer and the external volume of the positive electrode active material are measured. The mass of the positive electrode active material layer is divided by the external volume of the positive electrode active material layer to obtain the electrode density of the positive electrode active material layer. "The external volume of the positive electrode active material layer" is a volume obtained by measuring the vertical dimension, the lateral dimension, and thickness dimension of the positive electrode active material layer, and by calculation based on the measured values.

An example of a method for setting the electrode density within the above ranges may be a method in which the positive electrode active material layer is roll-pressed.

The electrode coating weight of the positive electrode active material layer is preferably 10 $g/m^2$ or more and 500 $g/m^2$ or less, and more preferably 20 $g/m^2$ or more and 200 $g/m^2$ or less. If the electrode coating weight of the positive electrode active material layer is within the above ranges, the energy density of the power storage device increases, which improves the cycle characteristics of the power storage device.

The coating weight of the positive electrode active material layer can be measured by the following method. The power storage device is disassembled to obtain the positive electrode. The obtained positive electrode undergoes a cleaning process with diethyl carbonate and is dried at 100 C°. A measurement sample having a specified area is punched out from the positive electrode to measure the mass. Subsequently, in the measurement sample, the positive electrode active material layer is peeled off from the positive electrode current collector and the mass of the remaining positive electrode current collector is measured. From the mass of the measurement sample, the mass of the remainder of the positive electrode current collector is subtracted to calculate the mass of the positive electrode active material layer. The mass of the positive electrode active material layer is divided by the area of the measurement sample to calculate the coating weight of the positive electrode active material layer.

(1-7) Negative Electrode Current Collector

For the negative electrode current collector, stainless steel, copper, nickel, and so on can be used. The thickness of the negative electrode current collector is not particularly limited. The thickness of the negative electrode current collector in general is 1 μm or larger and 50 μm or smaller, preferably 5 μm or larger and 40 μm or smaller, and particularly preferably 10 μm or larger and 30 μm or smaller.

The negative electrode current collector comprises the first through-holes penetrating the negative electrode current collector in the thickness direction. The lower limit of the aperture ratio of the first through-holes (hereinafter referred to as first through-hole aperture ratio) on the negative electrode current collector is preferably 0.001%, more preferably 0.005%, more preferably 0.01%, more preferably 0.02%, and particularly preferably 0.05%.

The upper limit of the first through-hole aperture ratio is preferably 1%, more preferably 0.7%, further preferably 0.5%, and particularly preferably 0.3%. If the first through-hole aperture ratio is equal to or higher than the lower limit, the initial discharge capacity of the power storage device increases, which improves the cycle characteristics of the power storage device. If the first through-hole aperture ratio is equal to or lower than the upper limit, a sufficient electrode strength can be maintained, which can inhibit breaking of the electrode and the cell during the manufacturing.

The first through-hole aperture ratio (%) can be obtained by Formula (2) below.

First through-hole aperture ratio (%)=[1−(mass of negative electrode current collector/absolute specific gravity of negative electrode current collector)/(apparent volume of negative electrode current collector)]×100    Formula (2):

"Apparent volume of negative electrode current collector" is a volume obtained by measuring the vertical dimension, the lateral dimension, and thickness dimension of the negative electrode current collector, and by calculation based on the measured values.

The lower limit of the aperture width of the first through-holes is preferably 0.1 μm, more preferably 0.5 μm, further preferably 1 μm, and particularly preferably 5 μm. The upper limit of the aperture width of the first through-holes is preferably 100 μm, more preferably 50 μm, and further preferably 30 μm. If the aperture width of the first through-holes is equal to or larger than the lower limit, the cycle characteristics of the power storage device are improved. If the aperture width of the first through-holes is equal to or smaller than the upper limit, the energy density of the power storage device increases, and lithium becomes less likely to be precipitated on the surface of the electrode during the cyclic charging and discharging.

The aperture width of the first through-holes is the average value of the aperture widths measured at each of the first through-holes (hereinafter referred to as individual aperture width). The individual aperture width is the maximum value of the distance between the ends of the opening of the first through-hole. For example, if the hole shape of the first through-holes is circular, the diameter of the circle is the individual aperture width. If the shape of the first through-hole is elliptical, the length of the major axis of the ellipse is the individual aperture width. If the hole shape of the first through-hole is polygonal, the length with the maximum value among the lengths of diagonals of the polygon is the individual aperture width.

The lower limit of the interval between adjacent first through-holes (hereinafter referred to as aperture interval between the first through-holes) is, for example, 100 μm, preferably 150 μm, more preferably 200 μm, and further preferably 250 μm. The upper limit of the aperture interval between the first through-holes is, for example, 5000 μm, preferably 3000 μm, more preferably 2000 μm, and particularly preferably 1000 μm. If the aperture interval between the first through-holes is equal to or larger than the lower limit, the energy density of the power storage device becomes high and a sufficient electrode strength can be maintained, which can inhibit breaking of the electrode and the cell during the manufacturing. If the aperture interval between the first through-holes is equal to or smaller than the upper limit, the cycle characteristics of the power storage device are improved.

The aperture interval between the first through-hole is the average value of the aperture intervals of two adjacent first through-holes measured at various locations (hereinafter referred to as individual aperture interval). The individual aperture interval can be defined as follows. Assume that there are two adjacent first through-holes 97A, 97B. A position on the outer periphery of the first through-hole 97A that is closest to the first through-hole 97B is represented as PA. A position on the outer periphery of the first through-hole 97B that is closest to the first through-hole 97A is represented as PB. The individual aperture interval between the first through-holes 97A and 97B is the distance between PA and PB.

The lower limit of the number of the first through-holes per unit area is, for example, 0.04 holes/mm$^2$, preferably 0.1 holes/mm$^2$, more preferably 0.25 holes/mm$^2$, and further preferably 1 hole/mm$^2$. The upper limit of the number of the first through-holes per unit area is, for example, 100 holes/mm$^2$, preferably 50 holes/mm$^2$, more preferably 25 holes/mm$^2$, and further preferably 15 holes/mm$^2$. If the number of the first through-holes per unit area is in the range of equal to or larger than the lower limit and equal to or smaller than the upper limit, the energy density of the power storage device increases, which improves the cycle characteristics of the power storage device.

(1-8) Negative Electrode Active Material

For the negative electrode active material, it is possible to use a substance that can allow reversible doping and dedoping with lithium. An example of the negative electrode active material may be graphite-based particles. Examples of the graphite-based particles include graphite-based composite particles and polyacene-based organic semiconductors (PAS).

The graphite-based composite particles each comprise a core particle and a graphitized substance covering the surface of the core particle. Examples of the core particle include graphite, hardly graphitizable carbon, and natural graphite. Examples of the graphitized substance include graphitized substances deriving from tar or pitch.

The polyacene-based organic semiconductors have a polyacene-type skeletal structure. In the polyacene-type skeletal structure, the atomic ratio between hydrogen atoms and carbon atoms is 0.05 or more and 0.50 or less.

If the atomic ratio between hydrogen atoms and carbon atoms exceeds 0.50 in the PAS, the electron conductivity becomes low and thus there is a possibility that the internal resistance of the cell becomes low. If, on the other hand, the atomic ratio between hydrogen atoms and carbon atoms is less than 0.05, the capacity per unit mass decreases and thus there is a possibility that the energy density of the cell decreases.

The above-mentioned aromatic condensation polymer means a condensate of aromatic hydrocarbon compounds and aldehydes. Examples of the aromatic hydrocarbon compounds include phenol, cresol, and xylenol. Examples of the aldehydes include formaldehyde, acetaldehyde, and furfural.

The 50% volume cumulative diameter (D50) of the graphite-based particles is preferably, from the aspect of improving the output, in the range of 1.0 μm or larger and 10 μm or smaller, and more preferably in the range of 2 μm or larger and 5 μm or smaller. If the 50% volume cumulative diameter (D50) of the graphite-base particles is smaller than 1.0 μm, manufacturing of the graphite-based particles is difficult. Moreover, if the 50% volume cumulative diameter (D50) of the graphite-base particles is smaller than 1.0 μm, there is a possibility that the durability of the power storage device decreases due to, for example, a gas being produced during charging. If the 50% volume cumulative diameter (D50) of the graphite-base particles exceeds 10 μm, it becomes difficult to achieve a power storage device having a sufficiently small internal resistance.

The specific surface area of the negative electrode active material is preferably 0.1 m$^2$/g or larger and 200 m$^2$/g or smaller, and more preferably 0.5 m$^2$/g or larger and 50 m$^2$/g or smaller. If the specific surface area of the negative electrode active material is smaller than 0.1 m$^2$/g, the resistance of the achieved power storage device becomes higher. If the specific surface area of the negative electrode active material exceeds 200 m$^2$/g, irreversible capacity during charging of the achieved power storage device increases and thereby there is a possibility that the durability of the power storage device decreases due to, for example, a gas being produced during charging. The 50% volume cumulative diameter (D50) of the graphite-based particles is a value obtained by the micro-track method.

(1-9) Negative Electrode Active Material Layer

The negative electrode active material layer is formed by attaching the negative electrode active material to the surface of the negative electrode current collector. Examples of a method for attaching the negative electrode active material include coating, printing, injecting, spraying, vapor deposition, and pressure bonding. The thickness of the negative electrode active material layer on one side of the negative electrode current collector is preferably 5 μm or larger and 500 μm or smaller, more preferably 10 μm or larger and 200 μm or smaller, and particularly preferably 10 μm or larger and 100 μm or smaller. If the thickness of the negative electrode active material layer is within the above ranges, a capacity necessary for the negative electrode can be maintained. Moreover, if the thickness of the negative electrode active material layer is within the above ranges, the diffusion resistance of the ions moving in the negative electrode active material layer becomes small. Accordingly, the internal resistance of the power storage device decreases.

If the negative electrode is used for manufacturing the electrode of the lithium ion rechargeable battery, the density of the negative electrode active material layer is preferably 1.30 g/cc or higher and 2.00 g/cc or lower, and more preferably 1.40 g/cc or higher and 1.90 g/cc or lower.

On at least one side of the negative electrode current collector, the negative electrode active material layer comprises the second through-holes penetrating the negative electrode active material layer in the thickness direction. The lower limit of the aperture ratio (hereinafter referred to as second through-hole aperture ratio) of the second through-holes on the negative electrode active material layer is preferably 0.005%, more preferably 0.01%, further preferably 0.02%, and particularly preferably 0.05%.

The upper limit of the second through-hole aperture ratio is preferably 1%, more preferably 0.7%, further preferably 0.5%, and particularly preferably 0.3%. If the second through-hole aperture ratio is in the range of equal to or higher than the lower limit and equal to or lower than the upper limit, the energy density of the power storage device becomes high, which improves the cycle characteristics of the power storage device.

The second through-hole aperture ratio (%) can be obtained by Formula (3) below.

Second through-hole aperture ratio (%)=(total area of second through-holes)/[(area of portion where negative electrode active material layer is formed)+(area of second through-holes)]×100   Formula (3):

The lower limit of the second through-hole aperture ratio is, for example, 0.1 μm, preferably 0.5 μm, more preferably 1 μm, and further preferably 5 μm. The upper limit of the second through-hole aperture ratio is, for example, 100 μm, preferably 50 μm, and more preferably 30 μm. If the second through-hole aperture ratio on the negative electrode active material layer is in the range of equal to or higher than the lower limit and equal to or lower than the lower limit, the energy density of the power storage device becomes high, which improves the cycle characteristics of the power storage device.

The aperture width of the second through-hole is the average value of the aperture widths measured at each of the second through-holes (hereinafter referred to as individual aperture width). The individual aperture width is the maximum value of the distance between the ends of the opening of the second through-hole. For example, if the hole shape of the second through-holes is circular, the diameter of the circle is the individual aperture width. If the hole shape of the second through-holes is elliptical, the length of the major axis of the ellipse is the individual aperture width. If the hole shape of the second through-hole is polygonal, the length with the maximum value among the lengths of diagonals of the polygon is the individual aperture width.

The lower limit of the interval between second through-holes (hereinafter referred to as aperture interval between the second through-holes) is, for example, 100 μm, preferably 150 μm, more preferably 200 μm, and further preferably 250 μm. The upper limit of the aperture interval between the second through-holes is, for example, 5000 μm, preferably 3000 μm, more preferably 2000 μm, and further preferably 1000 μm. If the aperture interval between the holes on the negative electrode active material layer is in the range of equal to or larger than the lower limit and equal to or smaller than the upper limit, the energy density of the power storage device becomes high, which improves the cycle characteristics of the power storage device.

The aperture interval between the second through-hole is the average value of the aperture intervals (hereinafter referred to as individual aperture interval) between two adjacent second through-holes measured at various locations. The individual aperture interval can be defined as follows. Assume that there are two adjacent second through-holes 99A, 99B. A position on the outer periphery of the second through-hole 99A that is closest to the second through-hole 99B is represented as PA. A position on the outer periphery of the second through-hole 99B that is closest to the second through-hole 99A is represented as PB. The individual aperture interval between the second through-holes 99A and 99B is the distance between PA and PB.

The lower limit of the number of the second through-holes per unit area is, for example, 0.04 holes/mm$^2$, preferably 0.1 holes/mm$^2$, more preferably 0.25 holes/mm$^2$, and further preferably 1 hole/mm$^2$. The upper limit of the number of the second through-holes per unit area is, for example, 100 holes/mm$^2$, preferably 45 holes/mm$^2$, more preferably 25 holes/mm$^2$, and further preferably 15 holes/mm$^2$. If the number of the second through-holes per unit area is equal to or larger than the lower limit and equal to or smaller than the upper limit, the energy density of the power storage device becomes high, which improves the cycle characteristics of the power storage device.

The second through-holes can be made by a method such as mechanical punching, laser processing, etching, and electrolytic etching. Examples of the laser used for the laser processing include $CO_2$ laser, YAG laser, and UV laser.

(1-10) Binder

The positive electrode with the positive electrode active material layer and the negative electrode with the negative electrode active material layer described above can be produced by a known manufacturing method.

For example, the positive electrode can be manufactured as follows. The positive electrode active material, a binder, and a solvent are mixed to prepare a positive electrode slurry. The positive electrode slurry may further contain a conductive material and a thickener as needed. An example of the thickener may be carboxymethyl cellulose (CMC). Examples of the solvent include water and an organic solvent.

The positive electrode with the positive electrode active material layer can be manufactured by a method in which the positive electrode slurry is applied on the positive electrode current collector. The positive electrode with the positive electrode active material layer can be also manufactured by a method in which the positive electrode slurry is formed into a sheet-like shape and the sheet-shaped molded material is adhered to the positive electrode current collector.

For example, the negative electrode can be manufactured as follows. The negative electrode active material, a binder, and a solvent are mixed to prepare a negative electrode slurry. The negative electrode slurry may further contain a conductive material and a thickener as needed. An example of the thickener may be carboxymethyl cellulose (CMC). Examples of the solvent include water and an organic solvent.

The negative electrode with the negative electrode active material layer can be manufactured by a method in which the negative electrode slurry is applied on the negative electrode current collector. The negative electrode with the negative electrode active material layer can be also manufactured by a method in which the negative electrode slurry is formed into a sheet-like shape and the sheet-shaped molded material is adhered to the negative electrode current collector.

Examples of the binders used for manufacturing the positive electrode and the negative electrode include rubber-based binder, fluorine-containing resin, and acrylic resin. An example of the rubber-based binder may be SBR. Examples of the fluorine-containing resin include fluorine-containing resin obtained by seed polymerization of, for example, polytetrafluoroethylene and/or polyvinylidene fluoride with acrylic resin.

Examples of the conductive materials used for manufacturing the positive electrode and the negative electrode include acetylene black, Ketjen black, graphite, and metal powder.

The addition amount of the binder and the conductive material can be suitably adjusted depending on the electric conductivities of the materials used, the shape of the electrodes to be made, and so on. The addition amount of the binder and the conductive material is generally preferably 2% by mass or more and 20% or less by mass relative to the active material, and particularly preferably 2% by mass or more and 10% by mass or less. The active material means the positive electrode active material and/or the negative electrode active material.

(1-11) Separator

The material for the separator in the power storage device according to the present disclosure is preferably a separator having an air permeance in the range of 1 sec or more and 200 sec or less. The air permeance is a value measured by a method in accordance with JISP8117.

The separator can be suitably selected and used among from, for example, nonwoven fabrics and microporous films made of polyethylene, polypropylene, polyester, cellulose, polyolefin, and cellulose/rayon. For the separator, nonwoven fabrics made of polyethylene, polypropylene, and cellulose/rayon are particularly preferable.

The thickness of the separator is, for example, 5 μm or larger and 20 μm or smaller, and preferably 5 μm or larger and 15 μm or smaller. If the thickness of the separators is smaller than 5 μm, a short-circuit is more likely to occur. If the thickness of the separator is larger than 20 μm, the resistance becomes high.

(1-12) Electrolyte Solution

In the power storage device according to the present disclosure, it is possible to use, for the electrolyte solution, an electrolyte solution containing an aprotic organic solvent in which lithium salt is dissolved, for example.

The electrolyte solution contains, for example, an aprotic organic solvent. Examples of the aprotic organic solvent include cyclic carbonate and chain carbonate. Examples of the cyclic carbonate include ethylene carbonate (EC), propylene carbonate (PC), and butylene carbonate. Examples of the chain carbonate include dimethyl carbonate (DMC), ethyl methyl carbonate (EMC), diethyl carbonate (EC), and methyl propyl carbonate. The electrolyte solution may be a mixed solvent in which two or more types of the above-described substances are mixed.

The aprotic organic solvent may contain an organic solvent other than the cyclic carbonate and the chain carbonate. Examples of the organic solvent other than the cyclic carbonate and the chain carbonate include cyclic ether, chain carboxylic acid ester, and chain ether. An example of the cyclic ether is γ-butyrolactone. An example of the chain carboxylic acid ester may be ethyl propionate. An example of the chain ether may be dimethoxyethane.

The electrolyte solution contains an electrolyte. An example of the electrolyte may be lithium salt. Examples of the lithium salt include $LiClO_4$, $LiAsF_6$, $LiB_{F4}$, $LiPF_6$, $LiN(C_2F_5SO_2)_2$, and $LiN(CF_3SO_2)_2$.

The lithium salt is preferably $LiPF_6$. $LiPF_6$ is high in ion conductivity and low in resistance. The concentration of the lithium salt in the electrolyte solution is preferably 0.1 mol/L or higher, and more preferably 0.5 mol/L or higher and 1.5 mol/L or lower. If the concentration of the lithium salt in the electrolyte solution is within the above ranges, the internal resistance of the power storage device can be decreased.

2. Method for Manufacturing Power Storage Device Negative Electrode (2-1) Configuration of Electrode Manufacturing Apparatus 1

The negative electrode of the power storage device (hereinafter also referred to as power storage device negative electrode) can be manufactured by, for example, an electrode manufacturing apparatus 1 shown in FIG. 1.

The configuration of the electrode manufacturing apparatus 1 will be described based on FIG. 1. The electrode manufacturing apparatus 1 comprises electrolyte solution tanks 3, 5, a cleaning tank 7, conveyor rollers 9, 11, 13, 15, 17, 19, 21, 23, 25, 27, 29, 31, 33, 35, 37, 39, 41, 43, 45 (hereinafter also collectively referred to as group of conveyor rollers), a supply roll 47, a wind-up roll 49, counter electrode members 51, porous insulating members 53, supporting tables 55, circulation filters 57, two direct current power sources 61, and a blower 63.

The electrolyte solution tank 3 is an upwardly open rectangular tank. The bottom surface of the electrolyte solution tank 3 has an approximately U-shaped cross-section. In the electrolyte solution tank 3, there are a partition plate 69, four counter electrode members 51, four porous insulating members 53, and the conveyor roller 17.

The partition plate 69 is supported by a supporting rod 67 penetrating the upper end of the partition plate 69. The supporting rod 67 is secured to a wall and the like that is not shown in the drawing. The partition plate 69 except for the upper end thereof is located inside the electrolyte solution tank 3. The partition plate 69 extends in an up-down direction and divides the interior of the electrolyte solution tank 3 into two spaces. At the lower end of the partition plate 69, the conveyor roller 17 is attached. The partition plate 69 and the conveyor roller 17 are secured by the supporting rod 68 penetrating the partition plate 69 and the conveyor roller 17. The partition plate 69 is notched in the vicinity of the lower end thereof so as not to contact the conveyor roller 17. There is a space between the conveyor roller 17 and the bottom surface of the electrolyte solution tank 3.

The four counter electrode members 51 are respectively supported by the corresponding supporting rods 70 penetrating the upper ends of the counter electrode members 51 and extend in the up-down direction. The supporting rods 70 are secured to a wall and the like that is not shown in the drawing. The counter electrode members 51 except for the upper ends thereof are located inside the electrolyte solution tank 3. Two out of the four counter electrode members 51 are disposed to sandwich the partition plate 69 from both sides. The remaining two counter electrode members 51 are disposed along the inner surface of the electrolyte solution tank 3.

There are spaces 71 between the counter electrode members 51 disposed beside the partition plate 69 and the counter electrode members 51 disposed along the inner surface of the electrolyte solution tank 3. The counter electrode members 51 are connected to the positive poles of the direct current power sources 61. The detailed structure of the counter electrode members 51 will be described later.

The porous insulating members 53 are respectively attached to the surfaces of the counter electrode members 51 located on the sides of the spaces 71. The detailed structure of the porous insulating members 53 will be described later.

The cleaning tank 7 has basically the same structure as that of the electrolyte solution tank 3. However, the counter electrode members 51 and the porous insulating members 53 do not exist in the cleaning tank 7.

The electrolytic tank 5 has basically the same structure as that of the electrolyte solution tank 3. However, there is a conveyor roller 27 in the electrolyte solution tank 5 in place of the conveyor roller 17.

The group of conveyor rollers conveys an electrode precursor 73, which will be described later, along a specific path. The path extends from the supply roll 47, passes through the electrolyte solution tank 3, the electrolyte solution tank 5, and the cleaning tank 7 in this order, and reaches the wind-up roll 49.

The portion of the path passing through the electrolyte solution tank 3 first goes downward through the space 71 between the porous insulating member 53 attached along the inner surface of the electrolyte solution tank 3 and the porous insulating member 53 beside the partition plate 69 facing the former porous insulating member 53, then is changed in direction of movement to upward by the conveyor roller 17, and finally moves upward through the space 71 between the porous insulating member 53 attached along the inner surface of the electrolyte solution tank 3 and the porous insulating member 53 beside the partition plate 69 facing the former porous insulating member 53.

The portion of the path passing through the electrolyte solution tank 5 first goes downward through the space 71 between the porous insulating member 53 attached along the inner surface of the electrolyte solution tank 5 and the porous insulating member 53 beside the partition plate 69 facing the former porous insulating member 53, then is changed in direction of movement to upward by the conveyor roller 27, and finally goes upward through the space 71 between the porous insulating member 53 attached along the inner surface of the electrolyte solution tank 5 and the porous insulating member 53 beside the partition plate 69 facing the former porous insulating member 53.

The portion of the path passing through the cleaning tank 7 first goes downward between the inner surface of the cleaning tank 7 and the partition plate 69, then is changed in direction of movement to upward by the conveyor roller 37, and finally goes upward between the inner surface of the cleaning tank 7 and the partition plate 69.

Among the group of conveyor rollers, the conveyor rollers 15, 21, 25, and 29 are made of a conductive material. The conveyor rollers 15, 21, 25, 29 are connected to the negative poles of the direct current power sources 61. The conveyor roller 13 presses the electrode precursor 73 toward the conveyor roller 15. The conveyor roller 19 presses the electrode precursor 73 toward the conveyor roller 21. The conveyor roller 23 presses the electrode precursor 73 toward the conveyor roller 25. The conveyor roller 31 presses the electrode precursor 73 toward the conveyor roller 29. The group of conveyor rollers corresponds to a conveyer assembly. The conveyor rollers 15, 21, 25, 29 correspond to conductive conveyor rollers.

The conveyor rollers 13, 19, 23, 31, except for shaft portions thereof, are made of elastomer. That is, the conveyor rollers 13, 19, 23, 31, including the surfaces thereof, are made of elastomer. The elastomer is an example of an elastic body. Accordingly, the conveyor rollers 13, 19, 23, 31 are elastically deformable.

The elastomer may be natural rubber or synthetic rubber. Examples of the elastomer include EPDM, EPR, SBR, NBR, isoprene rubber, butadiene rubber, acrylic rubber, chloroprene rubber, silicone rubber, urethane rubber, and fluoro rubber.

The supply roll 47 has the electrode precursor 73 wound around the outer circumference thereof. That is, the supply roll 47 holds the electrode precursor 73 in a wound state. The group of conveyor rollers draws out and conveys the electrode precursor 73 held by the supply roll 47.

The wind-up roll 49 winds up and keeps the power storage device negative electrode 75 conveyed by the group of conveyor rollers. The power storage device negative electrode 75 is manufactured by doping the electrode precursor 73 with alkali metal in the electrolyte solution tanks 3, 5.

The way of doping with the alkali metal may be intercalation of ionic alkali metal into the active material, formation of alkali metal alloy, or consumption of alkali metal ions by formation of an SEI (Solid Electrolyte Interface) film.

The counter electrode members 51 are accommodated in the electrolyte solution tanks 3, 5 as described above. The counter electrode members 51 have a plate-like shape. The counter electrode members 51 have a structure in which a conductive base material and an alkali metal containing plate are stacked. Examples of the material for the conductive base material include copper, stainless steel, and nickel. The form of the alkali metal containing plate is not particularly limited, and examples thereof include an alkali metal plate and an alkali metal alloy plate. The thickness of the alkali metal containing plate may be, for example, 0.03 mm or larger and 3 mm or smaller.

The porous insulating members 53 have a plate-like shape. The porous insulating members 53 are attached to the surfaces of the counter electrode members 51. The plate-like shape of the porous insulating members 53 is a shape when the porous insulating members 53 are attached to the surfaces of the counter electrode members 51. The porous insulating members 53 may be members that self maintain the given shape, or may be members, such as nets, that can be easily deformed.

The porous insulating members 53 and the electrode precursor 73, conveyed by the group of conveyor rollers, do not contact with each other. The shortest distance from the surface of the porous insulating member 53 to the electrode precursor 73 is preferably in the rage of 0.5 min or longer and 100 mm or shorter, and particularly preferably in the range of 1 mm or longer and 10 mm or shorter. The shortest distance is a distance between a point on the surface of the porous insulating member 53 that is closest to the electrode precursor 73 and the electrode precursor 73.

The porous insulating members 53 are porous. Accordingly, a dope solution, which will be described later, can pass through the porous insulating members 53. This allows the counter electrode members 51 to contact with the dope solution.

An example of the porous insulating members 53 may be resin mesh. Examples of the resin include polyethylene, polypropylene, nylon, polyether ether ketone, and polytetrafluoroethylene. The aperture size of the mesh can be suitably set and may be set to, for example, 0.1 µm or larger and 10 mm or smaller; however, it is preferably in the range of 0.1 mm or larger and 5 mm or smaller. The thickness of the mesh can be suitably set and may be set to, for example, 1 µm or larger and 10 mm or smaller; however, it is preferably in the range of 30 µm or larger and 1 mm or smaller. The opening ratio of the mesh can be suitably set and may be set to, for example, 5% or more and 95% or less; however, it is preferably in the rage of 50% or more and 95% or less.

The porous insulating members 53 may be entirely made of an insulating material, or may partially comprise insulating layers.

The supporting tables 55 support the electrolyte solution tanks 3, 5 and the cleaning tank 7 from below. The height of the supporting tables 55 can be changed. When the supporting tables 55 are lowered while the positions of the partition plates 69, the counter electrode members 51, and the porous insulating members 53 in the up-down direction are maintained, the electrolyte solution tanks 3, 5 can be moved downward relative to the partition plates 69, the counter electrode members 51, and the porous insulating members 53. When the supporting tables 55 are raised, the electrolyte solution tanks 3, 5 can be moved upward relative to the partition plates 69, the counter electrode members 51, and the porous insulating members 53.

The circulation filters 57 are respectively provided to the electrolyte solution tanks 3, 5. The circulation filters 57 each comprise a filter 81, a pump 83, and a piping 85.

In the circulation filter 57 of the electrolyte solution tank 3, the piping 85 extends from the electrolyte solution tank 3, sequentially passes through the pump 83 and the filter 81, and returns to the electrolyte solution tank 3. The dope solution in the electrolyte solution tank 3 circulates in the piping 85 and the filter 81 and returns again to the electrolyte solution tank 3 due to the driving force of the pump 83. At this time, impurities and the like in the dope solution are filtered by the filter 81. The impurities include impurities precipitated from the dope solution, and impurities produced from the electrode precursor 73. In FIG. 1, illustration of the dope solution is omitted for convenience.

In the circulation filter 57 of the electrolyte solution tank 5, the piping 85 extends from the electrolyte solution tank 5, sequentially passes through the pump 83 and the filter 81, and returns to the electrolyte solution tank 5. The dope solution in the electrolyte solution tank 5 circulates in the piping 85 and the filter 81 and returns again to the electrolyte solution tank 5 due to the driving force of the pump 83. The circulation filter 57 of the electrolyte solution tank 5 has the same functions and effects as those of the circulation filter 57 of the electrolyte solution tank 3.

Examples of the material for the filter 81 may include resin such as polypropylene and polytetrafluoroethylene. The pore diameter of the filter 81 can be suitably set and may be set to, for example, 30 µm or larger and 50 µm or smaller.

The negative terminal of one of the two direct current power sources 61 (hereinafter referred to as one of the direct current power source 61) is connected to each of the conveyor rollers 15, 21. The positive terminal of the one of the direct current power sources 61 is connected to each of four counter electrode members 51 in total. The four counter electrode members 51 are the counter electrode members 51 in the electrolyte solution tank 3. The electrode precursor 73 contacts the conductive conveyor rollers 15, 21, and the electrode precursor 73 and the counter electrode members 51 in the electrolyte solution tank 3 are electrically connected since the electrode precursor 73 and the counter electrode members 51 in the electrolyte solution tank 3 are inside the dope solution which is the electrolyte solution.

The negative terminal of the other of the two direct current power sources 61 (hereinafter referred to as other direct current power source 61) is connected to each the conveyor rollers 25, 29. The positive terminal of the other direct current power source 61 is connected to each of four counter electrode members 51 in total. The four counter electrode members 51 are the counter electrode members 51 in the electrolyte solution tank 5. The electrode precursor 73 contacts the conductive conveyor rollers 25, 29. The electrode precursor 73 and the counter electrode members 51 in the electrolyte solution tank 5 are inside the dope solution which is the electrolyte solution. Accordingly, the electrode precursor 73 and the counter electrode members 51 in the electrolyte solution tank 5 are electrically connected.

The blower 63 blows gas to the power storage device negative electrode 75 coming out of the cleaning tank 7 to vaporize the cleaning solution, and dries the power storage device negative electrode 75. The gas that is used is preferably a gas inert with respect to the active material doped with the alkali metal. Examples of such a gas include helium gas, neon gas, argon gas, and dehumidified air from which water has been removed.

(2-2) Structure of Electrode Precursor 73

The structure of the electrode precursor 73 will be described based on FIG. 2A and FIG. 2B. The electrode precursor 73 is a long strip-like member. As shown in FIG. 2B, the electrode precursor 73 comprises a negative electrode current collector 93 and negative electrode active material layers 95. The negative electrode active material layers 95 are formed on both sides of the negative electrode current collector 93. In the electrode precursor 73, the negative electrode active material layers 95 are not yet doped with lithium.

The negative electrode active material layers 95 can be formed by a method in which the negative electrode slurry is applied on the negative electrode current collector 93. The negative electrode active material layers 95 can be formed also by a method in which the negative electrode slurry is formed into a sheet-like shape and the sheet-shaped molded material is adhered to the negative electrode current collector 93.

Figure 2A:
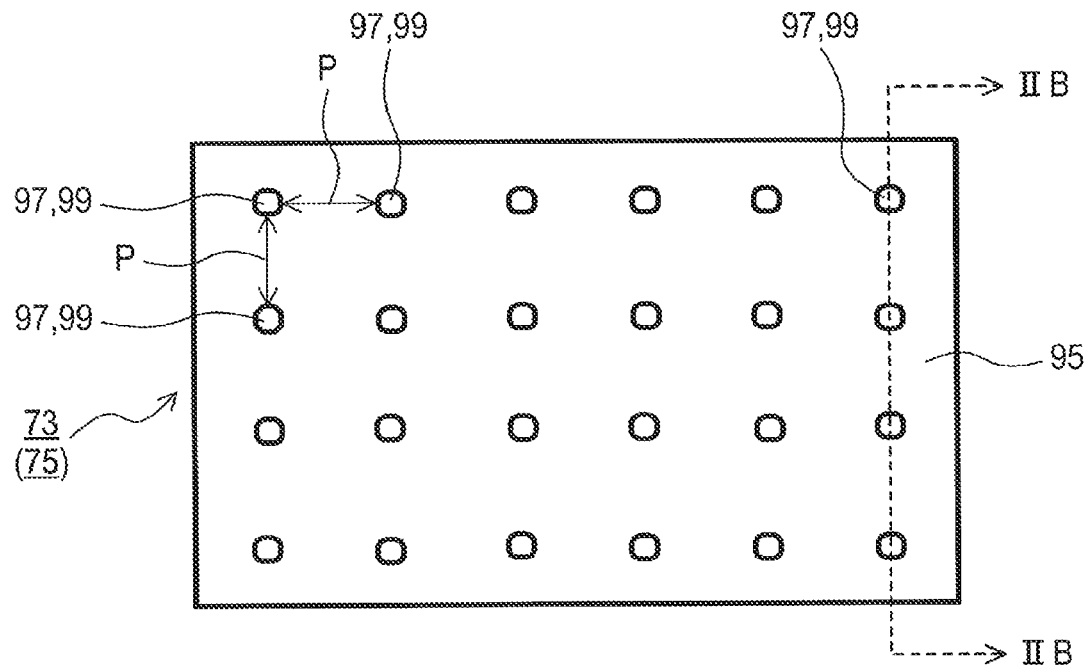
FIG. 2A is a plan view showing a structure of an electrode precursor and a power storage device negative electrode.
Figure 2B:
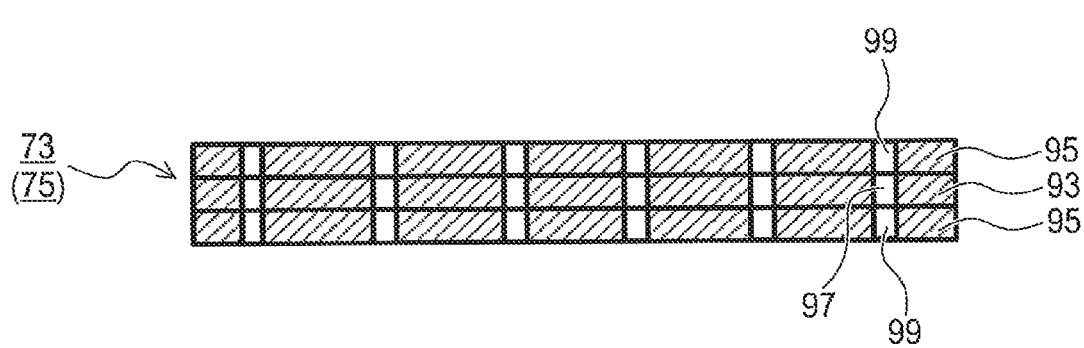
FIG. 2B is a sectional view cut along a cross-section IIB-IIB in FIG. 2A.

As shown in FIG. 2A and FIG. 2B, the negative electrode current collector 93 comprises first through-holes 97 penetrating the negative electrode current collector 93 in a thickness direction thereof. On both sides of the negative electrode current collector 93, the negative electrode active material layers 95 comprise second through-holes 99. The second through-holes 99 penetrate the negative electrode active material layers 95 in a thickness direction thereof. In a view from a thickness direction of the electrode precursor 73, the first through-holes 97 and the second through-holes 99 are located at the same positions.

After forming the negative electrode active material layers 95 on both sides of the negative electrode current collector 93, the first through-holes 97 and the second through-holes 99 can be concurrently made by punching processing or laser processing.

Figure 3A:
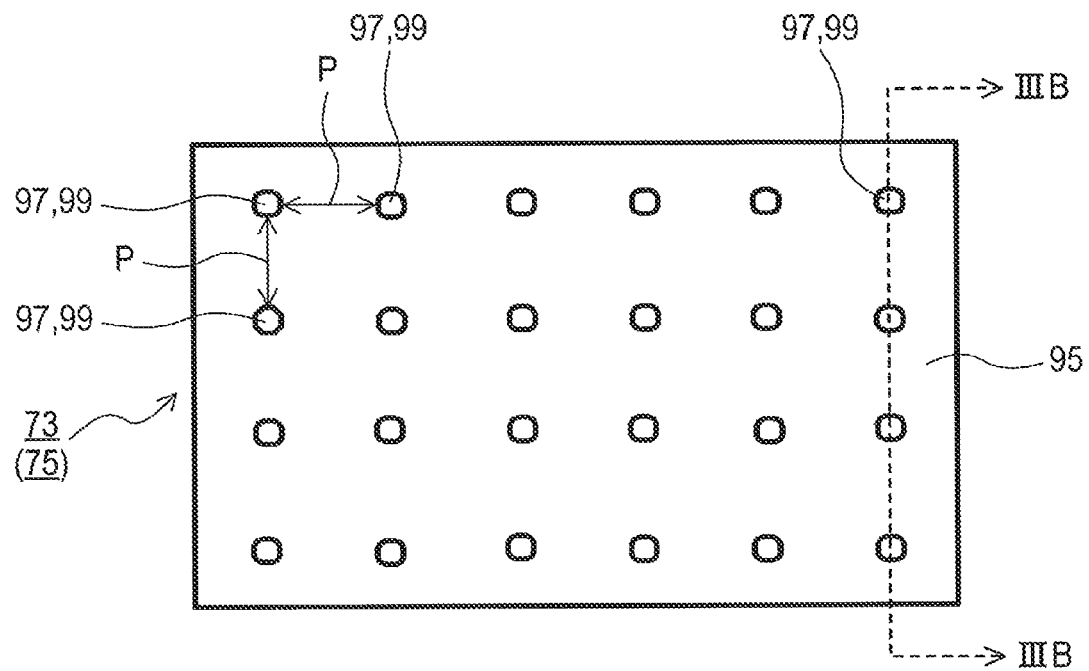
FIG. 3A is a plan view showing a structure of an electrode precursor and a power storage device negative electrode.
Figure 3B:
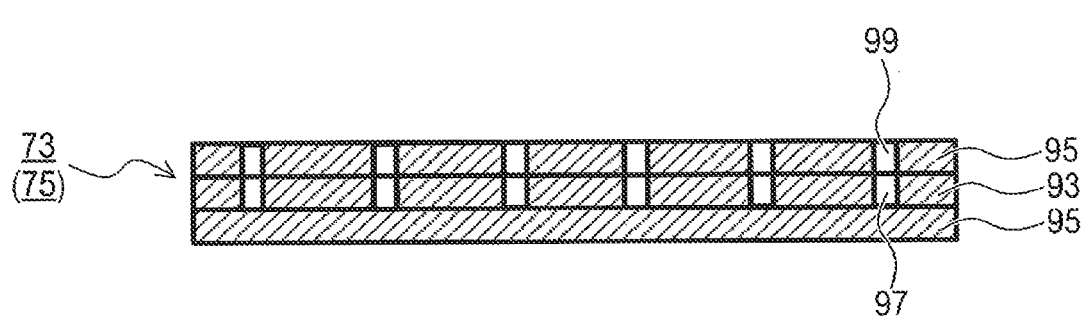
FIG. 3B is a sectional view cut along a cross-section IIIB-IIIB in FIG. 3A.

The structure of the electrode precursor 73 may be that shown in FIG. 3A and FIG. 3B. The structure of the electrode precursor 73 shown in FIG. 3A and FIG. 3B is basically the same as that of the electrode precursor 73 shown in FIG. 2A and FIG. 2B. However, the difference is that the second through-holes 99 are not made on the negative electrode active material layer 95 on one side of the negative electrode current collector 93.

(2-3) Method for Manufacturing Power Storage Device Negative Electrode

The electrode precursor 73 is wound around the supply roll 47. The dope solution is stored in the electrolyte solution tanks 3, 5. The dope solution contains alkali metal ions and a solvent. An example of the solvent may be an organic solvent. The organic solvent is preferably aprotic organic solvent. Examples of the aprotic organic solvent include ionic solutions such as ethylene carbonate, propylene carbonate, butylene carbonate, dimethyl carbonate, diethyl carbonate, methyl ethyl carbonate, 1-fluoroethylene carbonate, γ-butyrolactone, acetonitrile, dimethoxyethane, tetrahydrofuran, dioxolan, methylene chloride, sulfolane, diethylene glycol dimethyl ether (diglyme), diethylene glycol methyl ethyl ether, triethylene glycol dimethyl ether (triglyme), triethylene glycol butyl methyl ether, tetraethylene glycol dimethyl ether (tetraglyme), quaternary imidazolium salt, quaternary pyridinium salt, quaternary pyrrolidinium salt, quaternary piperidinium salt. The organic solvent may consist of a single component, or may be a mixed solvent containing two or more types of components.

The alkali metal ions contained in the dope solution are ions that make up alkali metal salt. The alkali metal salt is preferably lithium salt or sodium salt. Examples of an anionic part of the alkali metal salt includes, for example, phosphorous anion including fluoro group such as $PF_6^-$, $PF_3(C_2F_5)_3^-$, and $PF_3(CF_3)_3^-$; boron anion including fluoro group or cyano group such as $BF_4^-$, $BF_2(CF)_2^-$, $BF_3(CF_3)^-$, and $B(CN)_4^-$; sulfonyl imide anion including fluoro group such as $N(FSO_2)_2^-$, $N(CF_3SO_2)_2^-$, and $N(C_2F_5SO_2)_2^-$; and organic sulfone acid anion including fluoro groups such as $CF_3SO_3^-$.

The concentration of the alkali metal salt in the dope solution is preferably 0.1 mol/L or higher, and more preferably in the range of 0.5 to 1.5 mol/L. Within this range, doping with the alkali metal efficiently progresses.

The dope solution may further contain an additive/additives such as vinylene carbonate, vinyl ethylene carbonate, 1-fluoroethylene carbonate, 1-(trifluoromethyl) ethylene carbonate, succinic anhydride, maleic anhydride, propanesultone, diethyl sulfone.

The cleaning solution is stored in the cleaning tank 7. The cleaning solution preferably contains, for example, an aprotic solvent. An example of the aprotic solvent may be at least one type selected from carbonate-based solvent, ester-based solvent, ether-based solvent, hydrocarbon-based solvent, keton-based solvent, nitrile-based solvent, sulfur-containing solvent, and amide-based solvent. The cleaning solution may substantially consist of the aprotic solvent, or may contain other component(s) in addition to the aprotic solvent. The boiling point of the aprotic solvent is preferably 30° C. or higher and 200° C. or lower, more preferably 40° C. or higher and 150° C. or lower, and further preferably 50° C. or higher and 120° C. or lower. A boiling point of 30° C. or higher can inhibit excessive evaporation of the cleaning solution in the cleaning tank 7. A boiling point of 200° C. or lower facilitates removal of the cleaning solution from a cleaned power storage device negative electrode 75.

It is preferable that the composition of the dope solution stored in the electrolyte solution tank 3 and the composition of the dope solution stored in the electrolyte solution tank 5 are different. In this case, the power storage device negative electrode 75 with a higher quality can be efficiently manufactured.

An example of the state in which the compositions of the dope solutions in the electrolyte solution tanks 3, 5 vary may be a state in which the concentration of the SEI film forming component in the dope solution stored in the electrolyte solution tank 3 is higher than the concentration of the SEI film forming component in the dope solution stored in the electrolyte solution tank 5. The composition of the dope solution stored in the electrolyte solution tank 3 being different from the composition of the dope solution stored in the electrolyte solution tank 5 corresponds to conditions for doping the active material with the alkali metal being different between in a first doping process and in a second doping process.

Subsequently, the electrode precursor 73 is drawn out from the supply roll 47 and conveyed along the above-described path by the group of conveyor rollers. When the electrode precursor 73 passes through the electrolyte solution tanks 3, 5, the active material contained in the negative electrode active material layer 95 is doped with the alkali metal.

As described above, the process of the doping with the alkali metal corresponds to the doping processes. It is preferable that the current density in the first doping process performed in the electrolyte solution tank 3 and the current density in the second doping process performed in the electrolyte solution tank 5 are different. In this case, the power storage device negative electrode 75 with a higher quality can be efficiently manufactured.

An example of the state in which the current densities being different in the first doping process and the second doping process may be a state in which the current density in the first doping process is higher or lower than the current density in the second doping process. The current density in the first doping process and the current density in the second doping process being different corresponds to the conditions for doping the active material with the alkali metal being different between in the first doping process and in the second doping process.

If the counter electrode members 51 stored in the electrolyte solution tanks 3, 5 each comprise the conductive base material and the alkali metal containing plate disposed on the conductive base material, the mass of the alkali metal that is contained in the alkali metal containing plate stored in the electrolyte solution tank 3 and the mass of the alkali metal that is contained in the alkali metal containing plate stored in the electrolyte solution tank 5 may be different.

An example of the state in which the masses of the alkali metal contained in the alkali metal containing plates stored in the electrolyte solution tanks 3, 5 being different may be a state in which the mass of the alkali metal contained in the alkali metal containing plate stored in the electrolyte solution tank 3 is larger or smaller than the mass of the alkali metal contained in the alkali metal containing plate stored in the electrolyte solution tank 5. The mass of the alkali metal contained in the alkali metal containing plate stored in the electrolyte solution tank 3 and the mass of the alkali metal contained in the alkali metal containing plate stored in the electrolyte solution tank 5 being different corresponds to the conditions for doping the negative electrode active material with the alkali metal being different between in the first doping process and in the second doping process.

Doping of the negative electrode active material with the alkali metal makes the electrode precursor 73 into the power storage device negative electrode 75. While being conveyed by the group of conveyor rollers, the power storage device negative electrode 75 is cleaned in the cleaning tank 7. Finally, the power storage device negative electrode 75 is wound up by the wind-up roll 49. The power storage device negative electrode 75 has the same structure as that of the electrode precursor 73 except that the negative electrode active material is doped with lithium.

The electrode manufacturing apparatus 1 is suitable for manufacturing power storage device negative electrodes of alkali ion capacitors or batteries, and particularly suitable for manufacturing power storage device negative electrodes of lithium ion capacitors or lithium ion rechargeable batteries.

In the power storage device negative electrode 75, the lower limit of the doping amount of the alkali metal in 1 g of the active material is preferably 10 mg, more preferably 30 mg, and further preferably 50 mg. The upper limit of the doping amount of the alkali metal in 1 g of the active material is preferably 500 mg, more preferably 300 mg, and further preferably 100 mg. If the doping amount is in the rage of equal to or more than the lower limit and equal to or less than the upper limit and used for the lithium ion capacitors, it is possible to achieve an effect in which the lithium ion capacitors become high-voltage and long-life capacitors.

The doping amount of the alkali metal is preferably 70% or more and 95% or less relative to the theoretical capacity of the negative electrode active material, if lithium is occluded in the negative electrode active material for the lithium ion capacitors, and is preferably 10% or more and 30% or less relative to the theoretical capacity of the negative electrode active material, if lithium is occluded in the negative electrode active material for the lithium ion rechargeable batteries.

3. Method for Manufacturing Capacitor

The method for manufacturing the capacitor according to the present disclosure is a method for manufacturing the capacitor comprising the positive electrode, the negative electrode, and the electrolyte; the method includes the processes for manufacturing the power storage device negative electrode in accordance with "2. Method for Manufacturing Power Storage Device Negative Electrode" described above.

The capacitor is not particularly limited as long as it is a capacitor that uses insertion/removal of alkali metal ions. Examples of the capacitor include lithium ion capacitor and sodium ion capacitors. Among them, the lithium ion capacitors are preferable.

The basic structure of the positive electrode of the capacitor may be the general structure. It is preferable that the active carbon is used for the positive electrode active material.

The form of the electrolyte of the capacitor is generally a liquid electrolyte solution. The basic composition of the electrolyte solution is the same as the composition of the above-described dope solution. The concentration of the alkali metal ions (alkali metal salt) in the electrolyte is preferably 0.1 mol/L or higher, and more preferably in the range of 0.5 mol/L or higher and 1.5 mol/L or lower. The electrolyte may have a gel-like or solid-like form in order to inhibit liquid leakage.

The capacitor may comprise a separator between the positive electrode and the negative electrode to inhibit a physical contact of the positive electrode and the negative electrode. Examples of the separator include unwoven fabric or porous film made of raw material such as cellulose rayon, polyethylene, polypropylene, polyamide, polyester, and polyimide.

An example of the structure of the capacitor may be that of a stacked-type cell in which three or more of a plate-shaped constituent unit, including the positive electrode, the negative electrode, and the separator interposed therebetween, are stacked to form a laminate, and the laminate is sealed in an outer film.

An example of the structure of the capacitor may be a that of a wound-type cell in which a band-shaped constituent unit, including the positive electrode, the negative electrode, and the separator interposed therebetween, is wound to form a laminate, and the laminate is accommodated in a rectangular or a cylindrical container.

The capacitor can be manufactured by, for example, forming a basic structure, including at least the negative electrode and the positive electrode, and injecting the electrolyte into the basic structure.

In a case of the lithium ion capacitor, the density of the negative electrode active material layer thereof is preferably 0.50 g/cc or higher and 1.50 g/cc or lower, and particularly preferably 0.70 g/cc or higher and 1.20 g/cc or lower.

4. Method for Manufacturing Battery

The method for manufacturing the battery according to the present disclosure is a method for manufacturing the battery comprising the positive electrode, the negative electrode, and the electrolyte; the method includes the processes for manufacturing the power storage device negative electrode in accordance with "2. Method for Manufacturing Power Storage Device Negative Electrode" described above.

The battery is not particularly limited as long as it is a battery that uses insertion/removal of alkali metal ions. The battery may be a non-rechargeable battery, or may be a rechargeable battery. Examples of the battery include lithium ion rechargeable batteries, sodium ion rechargeable batteries, and air batteries. Among them, the lithium ion rechargeable batteries are preferable.

The basic structure of the positive electrode of the battery may be the general structure. For the positive electrode active material, organic active material, such as nitroxyl radical compound, and oxygen may be used other than those that have been already described.

The structure of the electrolyte of the battery and the structure of the battery itself are the same as those described in "3. Method for Manufacturing Capacitor" described above.

The battery can be manufactured by, for example, forming a basic structure, including at least the negative electrode and the positive electrode, and injecting the electrolyte into the basic structure.

5. Examples (5-1) Fabrication of Power Storage Device Negative Electrode of Example 1

A long strip-like negative electrode current collector was prepared. The dimension of the negative electrode current collector is 150 mm in width, 100 m in length, and 15 μm in thickness. The surface roughness Ra of the negative electrode current collector is 0.1 μm. The negative electrode current collector is made of a copper foil.

As shown in FIG. 2B, the negative electrode active material layers 95 were formed on both sides of the negative electrode current collector 93, and the electrode precursor 73 was obtained. The negative electrode active material layers 95 are 40 μm in thickness and are formed along the longitudinal direction of the negative electrode current collector 93. The negative electrode active material layers 95 are formed in the center portion of the negative electrode current collector 93 in the width direction to extend 120 mm in width. Negative electrode active material layer unformed portions at both ends of the negative electrode current collector 93 in the width direction are each 15 mm. The negative electrode active material layer unformed portions are portions in which the negative electrode active material layers 95 are not formed.

The negative electrode active material layer 95 contains graphite, carboxymethyl cellulose, acetylene black, the binder, and a dispersant at the mass ratio of 88:3:5:3:1. Graphite corresponds to the negative electrode active material. Acetylene black corresponds to the conductive agent.

Subsequently, the electrode precursor 73 was pressed using a press die in which pointed needles are arranged to make the through-holes that penetrate the electrode precursor 73 in the thickness direction in an area with specified length and width. The pointed needles in the press die are arranged at the positions that correspond to the positions of the through-holes made in the negative electrode current collector and the negative electrode active material layers.

The through-holes include the first through-holes 97 made on the negative electrode current collector 93 and the second through-holes 99 made on the negative electrode active material layers 95. The aperture width of the first through-holes 97 and that of the second through-holes 99 are each 15 μm.

The arrangement of the first through-holes 97 and the second through-holes 99 are shown in FIG. 2A. The aperture interval P of the first through-holes 97 and the aperture interval P of the second through-holes 99 are each 300 μm. The number of the first through-holes 97 per unit area and the number of the second through-holes 99 per unit area are each 11 holes per 1 $mm^2$. In a view from the thickness direction of the electrode precursor 73, the first through-holes 97 and the second through-holes 99 are located at the same positions.

Subsequently, the lithium electrode was fabricated as follows. First, a long copper plate with a thickness of 2 mm was prepared. On the copper plate, a lithium metal plate was adhered. The lithium metal plate is 120 mm in width×800 mm in length and 1 mm in thickness. The lithium metal plate is adhered along the longitudinal direction of the copper plate. The copper plate to which the lithium metal plate is adhered in this way forms the counter electrode member 51. Eight pieces of identical counter electrode members 51 were fabricated.

The electrode manufacturing apparatus 1 shown in FIG. 1 was prepared, and the electrode precursor 73 and the counter electrode members 51 were installed. Then, the electrolyte solution was supplied into the electrode manufacturing apparatus 1. The electrolyte solution contains 1.2 M of $LiPF_6$. The solvent of the electrolyte solution is a mixed solvent containing ethylene carbonate, ethyl methyl carbonate, and dimethyl carbonate at a volume ratio of 3:4:3.

Subsequently, the electrode precursor 73 and the counter electrode members 51 installed in the electrode manufacturing apparatus 1 were connected to the direct current power sources with current voltage monitors, and while the electrode precursor 73 was being conveyed at a speed of 21 m/h (0.35 m/min), a 40 A current was applied. The energization time was set, in consideration of the irreversible capacity, to a time within which a lithium storage ratio to the theoretical capacity of graphite (372 mAh/g) became 80%. The irreversible capacity had been estimated in advance by measuring the discharge capacity of the lithium doped negative electrode. By this process, the negative electrode active material in the negative electrode active material layer 95 was doped with lithium, and thereby the electrode precursor 73 was made into the power storage device negative electrode 75.

After being led through the cleaning tank 7 storing DMC (dimethyl carbonate) at 25° C., the power storage device negative electrode 75 was wound up. The power storage device negative electrode 75 was fabricated as described above.

(5-2) Fabrication of Power Storage Device Negative Electrodes of Examples 2-6

The power storage device negative electrodes of Examples 2-6 were fabricated in basically the same manner as that in Example 1. However, the difference is that the values of the aperture interval P of the first through-holes 97 and the aperture interval P of the second through-holes 99 are those shown in Table 1. Another difference is that the values of the aperture ratio of the first through-holes 97 and the aperture ratio of the second through-holes 99 are those shown in Table 1.

aperture interval P of the first through-holes 97 and the aperture interval P of the second through-holes 99 are those shown in Table 1 above. Another difference is that the values of the aperture ratio of the first through-holes 97 and the aperture ratio of the second through-holes 99 are those shown in Table 1 above.

(5-5) Fabrication of Power Storage Device Negative Electrode of Comparative Example 1

Figure 4A:
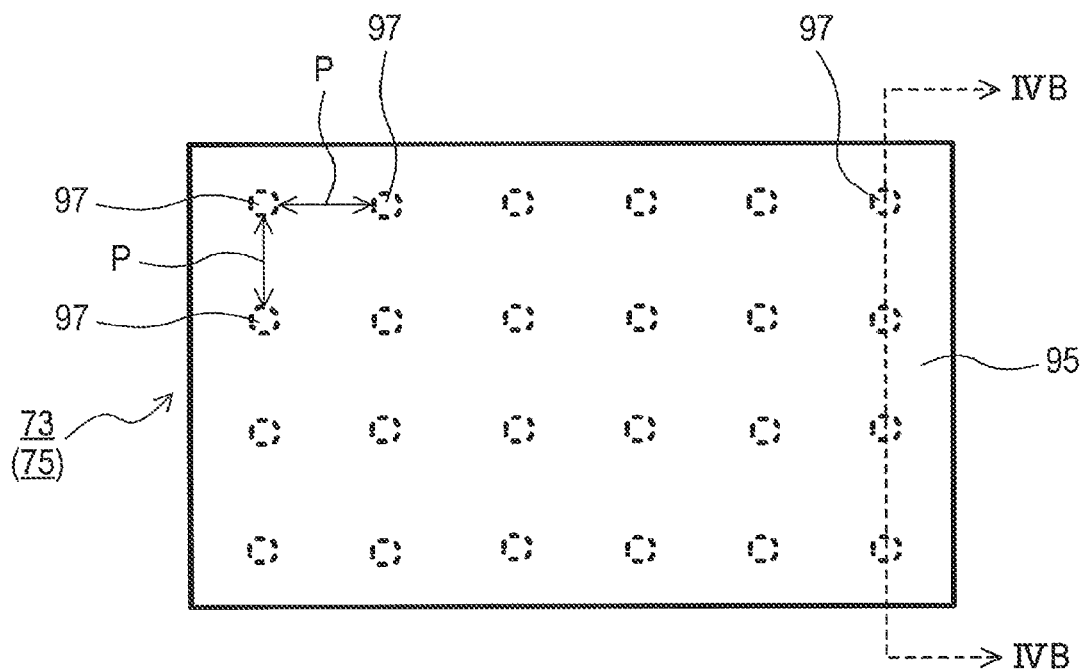
FIG. 4A is a plan view showing a structure of an electrode precursor and a power storage device negative electrode.
Figure 4B:
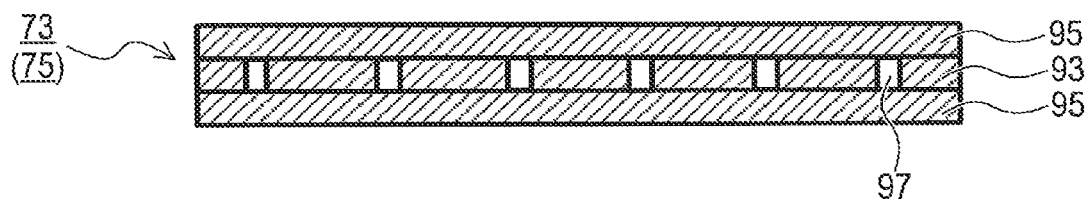
FIG. 4B is a sectional view cut along a cross-section IVB-IVB in FIG. 4A.

The power storage device negative electrode of Comparative Example 1 was fabricated in basically the same manner as that in Example 1. The structure of the power storage device negative electrode of Comparative Example 1 is shown in FIGS. 4A and 4B. However, as shown in FIG. 4B, the difference is that the second through-holes 99 are not made in the negative electrode active material layers 95 on either side of the negative electrode current collector 93. Another difference is that the values of the aperture interval P and the aperture ratio of the first through-holes 97 are those shown in Table 1 above.

TABLE 1

| Item | | Presence/absence of through holes | | 1st through holes | | | 2nd through holes | | | Electrode and cell properties | | | | |
|---|---|---|---|---|---|---|---|---|---|---|---|---|---|---|
| | | Current collector | Active material layer | Aperture width (μm) | Aperture interval P (μm) | Aperture ratio (%) | Aperture width (μm) | Aperture interval P (μm) | Aperture ratio (%) | Initial discharge capacity (mAh) | Initial resistance (mΩ) | After 100000-cycle capacity maintenance rate (%) | Presence/absence of Li precipitation | Breaking strength |
| Example | 1 | Present | Both sides | 15 | 300 | 0.196 | 15 | 300 | 0.196 | 15.5 | 48 | 91 | A | A |
| | 2 | Present | Both sides | 15 | 400 | 0.110 | 15 | 400 | 0.110 | 15.7 | 48 | 91 | A | A |
| | 3 | Present | Both sides | 15 | 500 | 0.071 | 15 | 500 | 0.071 | 15.9 | 48 | 90 | A | A |
| | 4 | Present | Both sides | 15 | 750 | 0.031 | 15 | 750 | 0.031 | 16.0 | 48 | 91 | A | A |
| | 5 | Present | Bothsides | 15 | 1000 | 0.018 | 15 | 1000 | 0.018 | 16.0 | 49 | 90 | A | A |
| | 6 | Present | Both sides | 15 | 1500 | 0.008 | 15 | 1500 | 0.008 | 16.1 | 49 | 89 | A | A |
| | 7 | Present | One side | 15 | 300 | 0.196 | 15 | 300 | 0.196 | 15.5 | 50 | 88 | A | A |
| | 8 | Present | One side | 15 | 1000 | 0.018 | 15 | 1000 | 0.018 | 16.0 | 50 | 87 | A | A |
| Comparative example | 1 | Present | None | 15 | 100 | 1.767 | — | — | — | 16.2 | 60 | 74 | B | B |
| | 2 | Present | None | 15 | 300 | 0.196 | — | — | — | 16.1 | 60 | 71 | B | A |
| | 3 | Present | Both sides | 15 | 100 | 1.767 | 15 | 100 | 1.767 | 13.3 | 45 | 92 | A | B |
| | 4 | Present | One side | 15 | 100 | 1.767 | 15 | 100 | 1.767 | 13.7 | 45 | 93 | A | B |
| | 5 | Present | Both sides | 300 | 1000 | 7.079 | 300 | 1000 | 7.079 | 11.3 | 40 | 83 | B | B |

(5-3) Fabrication of Power Storage Device Negative Electrode of Example 7

The power storage device negative electrode of Example 7 was fabricated in basically the same manner as that in Example 1. The structure of the power storage device negative electrode of Example 7 is shown in FIGS. 3A and 3B. However, as shown in FIG. 3B, the difference is that the second through-holes 99 are made on the negative electrode active material layer 95 only on one side of the negative electrode current collector 93, and the second through-holes 99 are not made on the negative electrode active material layer 95 on the other side of the negative electrode current collector 93.

Moreover, the difference is that the values of the aperture interval P of the first through-holes 97 and the aperture interval P of the second through-holes 99 are those shown in Table 1 above. Another difference is that the values of the aperture ratio of the first through-holes 97 and the aperture ratio of the second through-holes 99 are those shown in Table 1 above.

(5-4) Fabrication of Power Storage Device Negative Electrode of Example 8

The power storage device negative electrode of Example 8 was fabricated in basically the same manner as that in Example 7. However, the difference is that the values of the (5-6) Fabrication of Power Storage Device Negative Electrode of Comparative Example 2

The power storage device negative electrode of Comparative Example 2 was fabricated in basically the same manner as that in Comparative Example 1. However, the difference is that the values of the aperture interval P and the aperture ratio of the first through-holes 97 are those shown in Table 1 above.

(5-7) Fabrication of Power Storage Device Negative Electrode of Comparative Example 3

The power storage device negative electrode of Comparative Example 3 was fabricated in basically the same manner as that in Example 1. However, the difference is that the values of the aperture interval P of the first through-holes 97 and the aperture interval P of the second through-holes 99 are those shown in Table 1 above. Another difference is that the values of the aperture ratio of the first through-holes 97 and the aperture ratio of the second through-holes 99 are those shown in Table 1 above.

(5-8) Fabrication of Power Storage Device Negative Electrode of Comparative Example 4

The power storage device negative electrode of Comparative Example 4 was fabricated in basically the same manner as that in Example 1. However, the difference is that the values of the aperture interval P of the first through-holes 97 and the aperture interval P of the second through-holes 99 are those shown in Table 1 above. Another difference is that the values of the aperture ratio of the first through-holes 97 and the aperture ratio of the second through-holes 99 are those shown in Table 1 above.

(5-9) Fabrication of Power Storage Device Negative Electrode of Comparative Example 5

The power storage device negative electrode of Comparative Example 5 was fabricated in basically the same manner as that in Example 7. However, the difference is that the values of the aperture interval P of the first through-holes 97 and the aperture interval P of the second through-holes 99 are those shown in Table 1 above. Another difference is that the values of the aperture ratio of the first through-holes 97 and the aperture ratio of the second through-holes 99 are those shown in Table 1 above.

(5-11) Evaluation of Power Storage Device Negative Electrode

The power storage device negative electrode of each example and comparative example was evaluated in terms of the initial discharge capacity, the initial resistance, the after 100,000-cycle capacity maintenance rate (%), the presence or absence of Li precipitation, and the breaking strength. The results are shown in Table 1 above. The evaluation method is as follows.

Making Cell for Evaluation

Six pieces of negative electrodes in the size of 2.6 cm×4.0 cm (excluding terminal welded portions) were cut out. Five pieces of positive electrodes in the size of 2.4 cm×3.8 cm (excluding terminal welded portions) were also cut out. The positive electrodes and the negative electrodes were alternately stacked having separators, which are made of a 35 μm thick polyethylene nonwoven fabric, interposed therebetween to make an electrode laminate. At this time, the terminal welded portions of the positive electrode current collectors and the terminal welded portions of the negative electrode current collectors were placed on opposite sides. The negative electrodes were placed in the outermost portion of the electrode laminate.

Subsequently, the separators were respectively placed in the uppermost portion and the lowermost portion of the electrode laminate, and the four sides of the electrode laminate were taped. Then, the terminal welded portion of each of the five positive electrode current collectors was ultrasonic-welded to an aluminum positive terminal. The terminal welded portion of each of the six negative electrode current collectors was ultrasonic-welded to a copper negative terminal. The dimension of the positive terminal is 5 mm in width, 50 mm in length, and 0.2 mm in thickness. The dimension of the negative terminal is 5 mm in width, 50 mm in length, and 0.2 mm in thickness.

Subsequently, the electrode laminate was placed inside of a laminate film that is deep drawn to 3.5 mm, the opening portion of the laminate film was covered with another laminate film, and three out of four sides of the opening portion of the laminate film was fusion-bonded. Then, the inside of the laminate films was vacuum-impregnated with the electrolyte solution. Subsequently, the remaining one side out of the four sides of the opening portion of the laminate film that had not been fusion-bonded was fusion-bonded to complete a cell for evaluation. The electrolyte solution was a solution in which $LiPF_6$ was dissolved in the propylene carbonate at the concentration of 1 mol/L.

Initial Evaluation

The cell made for evaluation was charged at a constant current of 150 mA until the cell voltage became 3.8 V. Subsequently, constant current constant voltage charging, in which a constant voltage of 3.8 V was applied, was performed for 30 minutes. Then, the cell for evaluation was discharged at a constant current of 150 mA until the cell voltage became 2.2 V. A cycle test in which the above-described cycle was repeated was performed, and the discharge capacity at the second discharge was measured. This measured value was defined as the initial discharge capacity. A value obtained by dividing the voltage difference between the voltage immediately before the initiation of the second discharge and the voltage three seconds after the initiation of the discharge by the discharge current value was calculated. This calculated value was defined as the initial resistance. The initial resistance is a direct current internal resistance of the cell.

(After 100,000-Cycle Capacity Retention Rate)

Subsequently, the cell for evaluation was charged at a constant current of 1500 mA until the cell voltage became 3.8 V. Then, the cell for evaluation was discharged at a constant current of 1500 mA until the cell voltage became 2.2 V. The above-described cycle was repeated 100,000 cycles.

Subsequently, the cell for evaluation was charged at a constant current of 150 mA until the cell voltage became 3.8 V. Then, the constant current constant voltage charging, in which a constant voltage of 3.8 V was applied, was performed for 30 minutes. Then, the cell for evaluation was discharged at a constant current of 150 mA until the cell voltage became 2.2 V. A cycle test in which the above-described cycle was repeated was performed, and the cell capacity at the second discharge was defined as an after-cycle discharge capacity. An after 100,000-cycle capacity retention rate (%) was calculated based on Formula (4) below.

$$\text{After 100,000-cycle capacity retention rate (\%)} = \text{after-cycle discharge capacity/initial discharge capacity} \times 100 \quad \text{Formula (4):}$$

(Evaluation of Li Precipitation)

After the above-described 100,000 cycles of charging and discharging, the cell for evaluation was disassembled to remove the power storage device negative electrodes. In each of the removed power storage device negative electrodes, the area of the range in which the lithium metal had been precipitated (hereinafter referred to as lithium precipitated area) was measured.

If there was no power storage device negative electrode with the lithium precipitation area of 5% or less, the negative electrodes were rated as "A"; if there was any power storage device negative electrode with the lithium precipitation area of 5% or more, the negative electrodes were rated as "B".

The lithium precipitation area (%) was obtained by Formula (5) below.

$$\text{Lithium precipitation area (\%)} = \text{(lithium precipitation area of power storage device negative electrode)/(total area of power storage device negative electrode)} \times 100 \quad \text{Formula (5):}$$

Evaluation for Braking Strength

For evaluating the breaking strengths, strip-shaped sample pieces in the size of 20 mm in width×100 mm in length were punched out from the power storage device negative electrodes. Using the tabletop precision versatile testing machine (Autograph) AGS-X 5 kN manufactured by Shimazu Corporation, the strip-shaped sample pieces were pulled in their length direction with a force of 10 N. Then, if the strip-shaped sample pieces did not break, they rated as "A"; and if the sample piece broke, they were rated as "B".

The power storage device negative electrodes of each of the examples had low initial discharge capacities, high after 100,000-cycle capacity maintenance rates, and high breaking strengths.

In contrast, the power storage device negative electrodes of Comparative Examples 1 and 2 had high initial discharge capacities and low after 100,000-cycle capacity maintenance rates. The power storage device negative electrodes of Comparative Example 1 and Comparative Examples 3 to 5 had low breaking strengths. In the power storage device negative electrodes of Comparative Examples 1, 2, and 5, Li precipitation was observed.

Second Embodiment

1. Power Storage Device (1-1) Overall Structure of Power Storage Device

A power storage device according to the present disclosure comprises an electrode assembly and an electrolyte solution. The electrode assembly comprises a positive electrode, a separator, and a negative electrode. The negative electrode comprises a negative electrode current collector and a negative electrode active material layer. The negative electrode active material layer is formed on at least one side of the negative electrode current collector. The negative electrode is doped with lithium.

In the power storage device according to the present disclosure, at least one of the negative electrode and the positive electrode is preferably doped with lithium in advance. In the power storage device according to the present disclosure, it is more preferable that the negative electrode is doped with lithium in advance.

The method for doping at least one of the negative electrode and the positive electrode with lithium in advance may be a method described in the first embodiment.

The power storage device according to the present disclosure can be manufactured, for example, as follows. The positive electrode is manufactured by forming a positive electrode active material layer on the surface of a positive electrode current collector. The negative electrode is manufactured by forming the negative electrode active material layer on the surface of the negative electrode current collector. The positive electrode, a first separator, the negative electrode, and a second separator are stacked in this order to form a laminate.

The laminate is, for example, three or more stacked units, and each unit includes the positive electrode, the first separator, the negative electrode, and the second separator. Examples of the form of the laminate include a plate-like form, a sheet-like form, and a wounded form. In an excess portion of the first separator, at least one lithium electrode is disposed. The lithium electrode and the positive electrode are arranged not to contact with each other. The negative electrode current collector and the lithium electrode are short circuited. Through the above processes, the electrode assembly is completed.

The electrode assembly is sealed in an outer container. Examples of the form of the outer container include rectangular, cylindrical, and laminated forms. The outer container may be a film or a can. Subsequently, the outer container is filled with electrolyte. At this time, doping of the negative electrode active material layer with lithium from the lithium electrode is initiated. Consequently, the inside of the negative electrode active material layer is doped with lithium. Through the above processes, the power storage device is completed.

The power storage device according to the present disclosure comprises a structure basically similar to that of the power storage device described in, for example, Japanese Unexamined Patent Application Publication No. 2004-266091.

(1-2) Specific Example of Power Storage Device

A specific example of the power storage device according to the present disclosure may be the same power storage device as that in the first embodiment.

(1-3) Current Collector

"Current collector" includes the positive electrode current collector and the negative electrode current collector.

(1-4) Positive Electrode Current Collector

For example, the positive electrode current collector may comprise the third through-holes penetrating the positive electrode current collector in the thickness direction, for example, or the positive electrode current collector does not have to comprise such third through-holes. Examples of the positive electrode current collector with the third through-holes include porous current collectors, expanded metal, and punched metal. An example of a method for making the third through-holes may be the method described in the first embodiment.

The material for the positive electrode current collector may be the materials mentioned in the first embodiment. The thickness of the positive electrode current collectors is not particularly limited, but preferably in the range of 1 μm or larger and 50 μm or smaller, more preferably in the range of 5 μm or larger and 40 μm or smaller, and particularly preferably in the range of 10 μm or larger and 40 μm or smaller.

The third through-hole aperture ratio is preferably 0% or higher and 10% or lower. The third through-hole aperture ratio can be obtained by Formula (1) described above.

The third through-hole aperture ratio increases with the number of the third through-holes. The third through-hole aperture ratio increases with the size of the third through-holes.

(1-5) Positive Electrode Active Material

An example of the positive electrode active material may be that mentioned in the first embodiment.

(1-6) Positive Electrode Active Material Layer

The structure of the positive electrode active material layer is, for example, the same as that in the first embodiment.

(1-7) Negative Electrode Current Collector

For the negative electrode current collector, stainless steel, copper, nickel, and so on can be used. The thickness of the negative electrode current collector is not particularly limited. The thickness of the negative electrode current collector is generally 1 μm or larger and 50 μm or smaller, preferably 5 μm or larger and 40 μm or smaller, and particularly preferably 10 μm or larger and 30 μm or smaller.

The first through-hole aperture ratio is preferably 0% or higher and 0.1% or lower. The first through-hole aperture ratio can be obtained by Formula (2) described above. The first through-hole aperture ratio corresponds to the aperture ratio of the negative electrode current collector.

The negative electrode current collector may comprise the first through-holes, or does not have to comprise the first through-holes. The first through-hole aperture ratio increases with the number of the first through-holes. The first through-hole aperture ratio increases with the size of the first through-holes.

The upper limit of the first through-hole aperture ratio is preferably 0.1%, more preferably 0.05%, and further preferably 0%. If the first through-hole aperture ratio is equal to or lower than the upper limit, a sufficient electrode strength can be maintained, which can inhibit breaking of the electrode and the cell during the manufacturing.

(1-8) Negative Electrode Active Material

Examples of the negative electrode active material include those mentioned in the first embodiment.

(1-9) Negative Electrode Active Material Layer

The negative electrode active material layer is formed by attaching the negative electrode active material to at least one side of the negative electrode current collector. Examples of a method for attaching the negative electrode active material include coating, printing, injecting, spraying, vapor deposition, and pressure bonding. The thickness of the negative electrode active material layer on one side of the negative electrode current collector is preferably 5 µm or larger and 500 µm or smaller, more preferably 10 µm or larger and 200 µm or smaller, and particularly preferably 10 µm or larger and 100 µm or smaller. If the thickness of the negative electrode active material layer is within the above ranges, a capacity necessary for the negative electrode can be maintained. Moreover, if the thickness of the negative electrode active material layer is within the above ranges, the diffusion resistance of the ions moving in the negative electrode active material layer becomes small. Accordingly, the internal resistance of the power storage device decreases.

If the negative electrode is used for manufacturing the electrode of the lithium ion rechargeable battery, the density of the negative electrode active material layer is preferably 1.50 g/cc or higher and 2.00 g/cc or lower, and more preferably 1.60 g/cc or higher and 1.90 g/cc or lower.

The negative electrode active material layer comprises holes. The holes may penetrate the negative electrode active material layer, or the holes do not have to penetrate the negative electrode active material layer. The aperture ratio of the negative electrode active material layer is preferably 0.001% or higher and 10% or lower. With the aperture ratio of the negative electrode active material layer of 0.001% or higher and 10% or lower, the energy density of the power storage device becomes high, which improves the cycle characteristics of the power storage device.

The aperture ratio of the negative electrode active material layer can be obtained by Formula (6) below.

Aperture ratio of negative electrode active material layer (%)=[(volume of holes existing in 1 mm$^2$ of negative electrode active material layer)/(apparent volume of 1 mm$^2$ of negative electrode active material layer)]×100     Formula (6):

"Volume of holes existing in 1 mm$^2$ of negative electrode active material layer" in Formula (6) is a value obtained by multiplying the number N of the holes per 1 mm$^2$ by a hole volume V per hole. The hole volume V per hole is calculated assuming that the shape of the hole is conical. The diameter of the bottom surface of the cone is the aperture width W of the holes existing in the negative electrode active material layer. The height of the cone is the depth d of the holes existing in the negative electrode active material layer. The volume of the cone calculated based on the aperture width W and the hole depth d of the hole is referred to as the hole volume V per hole.

"Apparent volume of 1 mm$^2$ of negative electrode active material layer" in Formula (6) is a volume (mm$^3$) obtained by multiplying the thickness (mm) of the negative electrode active material layer by 1 mm$^2$.

The aperture ratio of the negative electrode active material layer increases with the number of the holes on the negative electrode active material layer. The aperture ratio of the negative electrode active material layer increases with the size of the holes on the negative electrode active material layer.

The lower limit of the aperture ratio of the negative electrode active material layer is preferably 0.001%, more preferably 0.01%, and particularly preferably 0.1%. The upper limit of the aperture ratio of the negative electrode active material layer is preferably 1%, more preferably 0.8%, and particularly preferably 0.6%. If the aperture ratio of the negative electrode active material layer is in the range of equal to or higher than the lower limit and equal to or lower than the lower limit, the energy density of the power storage device becomes higher, which further improves the cycle characteristics of the power storage device.

The hole depth d is the average value of the depths measured at individual holes. The hole depth d is preferably 1 µm or larger and 100 µm or smaller. If the hole depth d is 1 µm or larger and 100 µm or smaller, the cycle characteristics of the power storage device are improved without impairment of the energy density of the power storage device.

The ratio of the hole depth d to the thickness of the negative electrode active material layer is hereinafter referred to as a hole depth ratio. The lower limit of the hole depth ratio is preferably 5%, more preferably 10%, and further preferably 20%. The upper limit of the hole depth ratio is preferably 100%, more preferably 95%, and further preferably 90%. If the hole depth ratio is in the range of equal to or higher than the lower limit and equal to or lower than the upper limit, the cycle characteristics of the power storage device are improved without impairment of the energy density of the power storage device.

The aperture interval between the holes existing in the negative electrode active material layer is represented as P. The aperture interval P is the average value of the aperture intervals (hereinafter referred to as individual aperture interval) of two adjacent holes measured at various locations. The individual aperture interval can be defined as follows. Assume that there are two adjacent holes 199A, 199B. A position on the outer periphery of the hole 199A that is closest to the hole 199B is represented as PA. A position on the outer periphery of the hole 199B that is closest to the hole 199A is represented as PB. The individual aperture interval between the hole 199A and 199B is the distance between PA and PB.

The aperture interval P is preferably 10 µm or larger and 5000 µm or smaller. If the aperture interval P is 10 µm or larger and 5000 µm or smaller, the cycle characteristics of the power storage device are improved without impairment of the energy density of the power storage device.

The aperture width W of the hole is the average value of the aperture widths of the holes measured at individual holes. The aperture width W is preferably 0.1 µm or larger and 100 µm or smaller. If the aperture width W is 0.1 µm or larger and 100 µm or smaller, the cycle characteristics of the power storage device are improved without impairment of the energy density of the power storage device.

The number N of the holes per 1 mm$^2$ is preferably 0.1 holes or more and 1000 holes or less. If the number N of the holes per 1 mm$^2$ is 0.1 holes or more and 1000 holes or less, the cycle characteristics of the power storage device are improved without impairment of the energy density of the power storage device.

The holes of the negative electrode active material layer can be made by a method such as mechanical punching, laser processing, etching, and electrolytic etching. Examples of the laser used for the laser processing include $CO_2$ laser, YAG laser, and UV laser.

(1-10) Binder

The method for using the binder is, for example, the same as that in the first embodiment. Examples of the substances that can be used for the binder include those mentioned in the first embodiment.

(1-11) Separator

Examples of the separator include those mentioned in the first embodiment.

(1-12) Electrolyte Solution

In the power storage device according to the present disclosure, those mentioned in the first embodiment, for example, can be used for the electrolyte solution.

2. Method for Manufacturing Power Storage Device Negative Electrode (2-1) Configuration of Electrode Manufacturing Apparatus 1

The power storage device negative electrode can be manufactured with, for example, the electrode manufacturing apparatus 1 described in the first embodiment.

(2-2) Structure of Electrode Precursor 73

The structure of the electrode precursor 73 will be described based on FIG. 5A and FIG. 5B. The electrode precursor 73 is a long strip-like member. As shown in FIG. 5B, the electrode precursor 73 comprises the negative electrode current collector 93 and the negative electrode active material layers 95. The negative electrode active material layers 95 are formed on both sides of the negative electrode current collector 93. In the electrode precursor 73, the negative electrode active material layers 95 are not yet doped with lithium.

The negative electrode active material layers 95 can be formed by the method in which the negative electrode slurry is applied on the negative electrode current collector 93. The negative electrode active material layers 95 can be also formed by the method in which the negative electrode slurry is formed into a sheet-like shape and the sheet-shaped molded material is adhered to the negative electrode current collector 93.

Figure 5A:
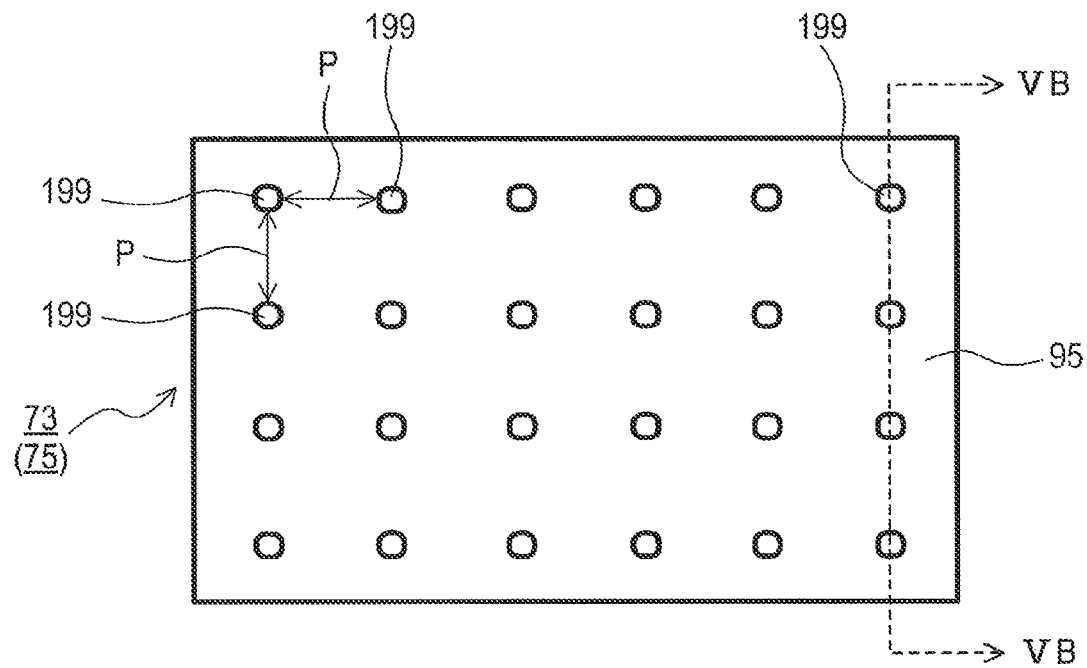
FIG. 5A is a plan view showing a structure of an electrode precursor and a power storage device negative electrode.
Figure 5B:
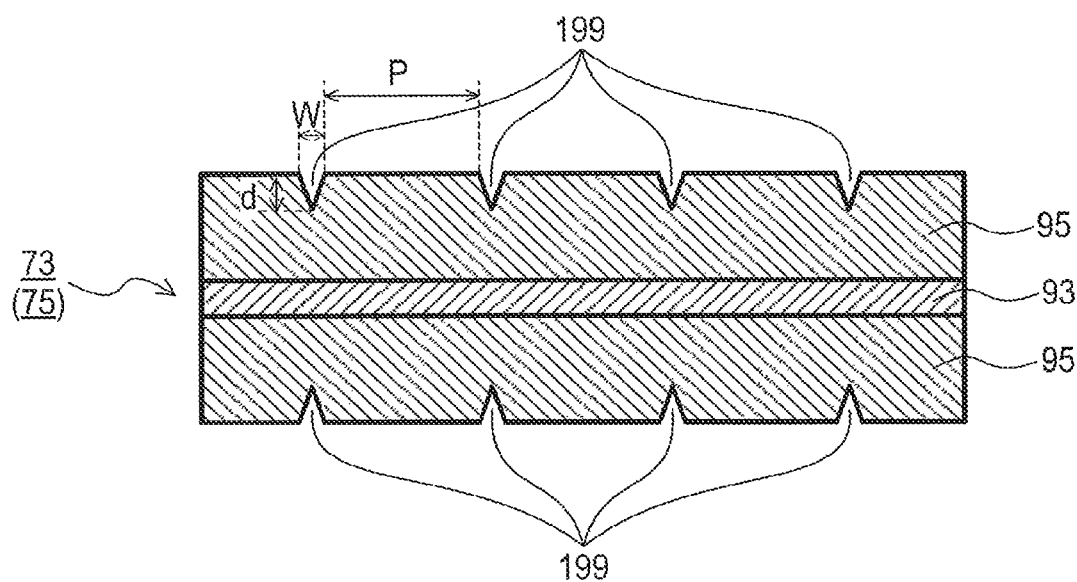
FIG. 5B is a sectional view cut along a cross-section VB-VB in FIG. 5A.

For example, as shown in FIG. 5A and FIG. 5B, the negative electrode active material layers 95 comprise holes 199 on both sides of the negative electrode current collector 93. The holes 199 may penetrate the negative electrode active material layers 95 in the thickness direction, or the holes 199 do not have to penetrate the negative electrode active material layers 95 in the thickness direction. The negative electrode active material layers 95 may comprise the holes 199 only on one side of the negative electrode current collector 93.

For example, after forming the negative electrode active material layers 95 on both sides of the negative electrode current collector 93, the holes 199 can be made by the punching processing or the laser processing.

Figure 6A:
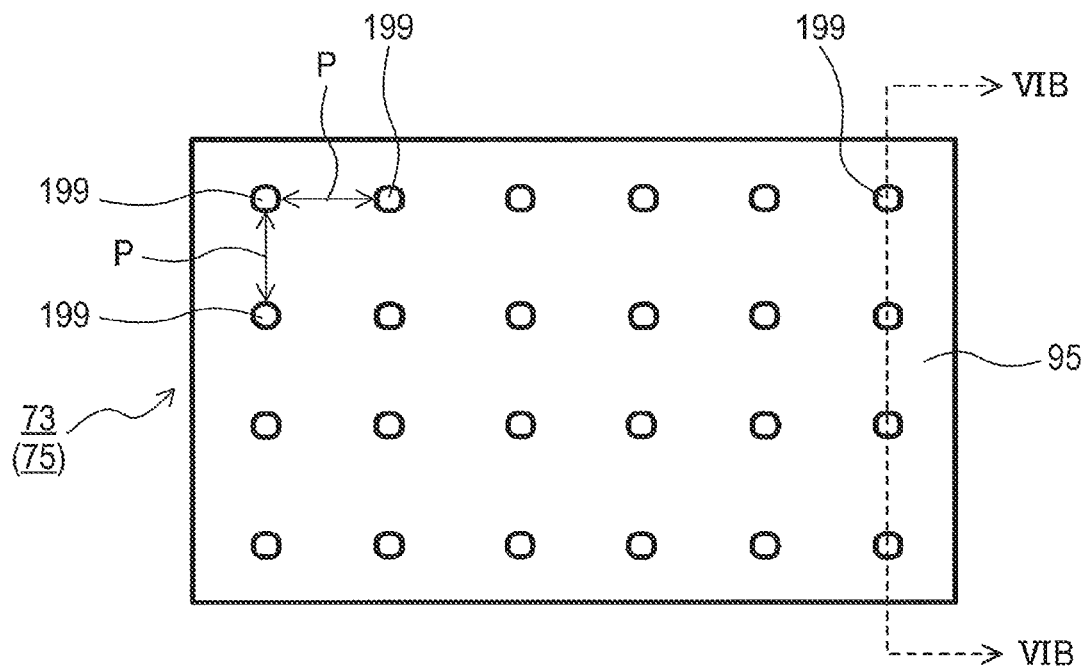
FIG. 6A is a plan view showing a structure of an electrode precursor and a power storage device negative electrode.
Figure 6B:
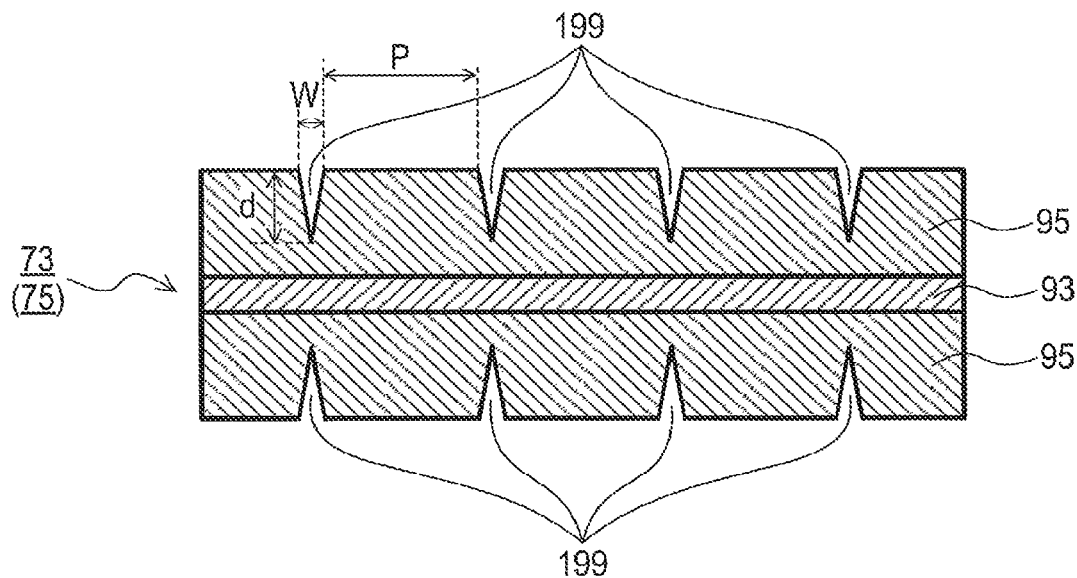
FIG. 6B is a sectional view cut along a cross-section VIB-VIB in FIG. 6A.

The structure of the electrode precursor 73 may be that shown in FIG. 6A and FIG. 6B. The structure of the electrode precursor 73 shown in FIG. 6A and FIG. 6B is basically the same as the structure of the electrode precursor 73 shown in FIG. 5A and FIG. 5B. However, the holes 199 are deeper than those in the structure shown in FIG. 5A and FIG. 5B.

(2-3) Method for Manufacturing Power Storage Device Negative Electrode

The method for manufacturing the power storage device negative electrode is, for example, basically the same as that in the first embodiment. The doping amount of the lithium ions in the negative electrode is preferably 50 mAh or more and 5000 mAh or less per 1 g of the negative electrode active material. If the doping amount is 50 mAh or more and 5000 mAh or less and the negative electrode is used for the lithium ion capacitor, the voltage of the lithium ion capacitor can be high, and furthermore, the durability of the lithium ion capacitor is improved.

3. Method for Manufacturing Capacitor

The method for manufacturing the capacitor according to the present disclosure is a method for manufacturing the capacitor including the positive electrode, the negative electrode, and the electrolyte, and the method comprises the processes for manufacturing the power storage device negative electrode in accordance with "2. Method for Manufacturing Power Storage Device Negative Electrode" described above in the second embodiment.

The structure and the manufacturing method of the capacitor are, for example, the same as those in the first embodiment except for the structure and the manufacturing method of the power storage device negative electrode.

4. Method for Manufacturing Battery

The method for manufacturing the battery according to the present disclosure is a method for manufacturing the battery including the positive electrode, the negative electrode, and the electrolyte, and the method comprises the processes for manufacturing the power storage device negative electrode in accordance with "2. Method for Manufacturing Power Storage Device Negative Electrode" described above in the second embodiment.

The structure and the manufacturing method of the battery are, for example, the same as those in the first embodiment except for the structure and the manufacturing method of the power storage device negative electrode.

5. Examples (5-1) Fabrication of Power Storage Device Negative Electrode of Example 9

A long strip-like negative electrode current collector was prepared. The dimension of the negative electrode current collector is 200 mm in width, 100 m in length, and 10 µm in thickness. The surface roughness Ra of the negative electrode current collector is 0.1 µm. The negative electrode current collector is made of a copper foil. As shown in FIG. 5B, the negative electrode active material layers 95 were formed on both sides of the negative electrode current collector 93, and the electrode precursor 73 was obtained.

The negative electrode active material layers 95 are 38 µm in thickness and formed along the longitudinal direction of the negative electrode current collector 93. The negative electrode active material layers 95 are formed in the center portion of the negative electrode current collector 93 in the width direction to extend 136 mm in width. The widths of the negative electrode active material layer unformed portions on both ends of the negative electrode current collector 93 in the width direction are each 32 mm. The negative electrode active material layer unformed portions are portions in which the negative electrode active material layers 95 are not formed.

The negative electrode active material layers 95 contain graphite, carboxymethyl cellulose, acetylene black, the binder, and the dispersant at the mass ratio of 88:3:5:3:1.

Graphite corresponds to the negative electrode active material. Acetylene black corresponds to the conductive agent.

Subsequently, the electrode precursor 73 was pressed using the press die in which the pointed needles are arranged. Consequently, as shown in FIG. 5A and FIG. 5B, holes 199 were formed on the negative electrode active material layers 95 on both sides of the negative electrode current collector 93.

The hole depth d of the holes 199 is 11 μm. The pointy ends of the holes 199 do not reach the negative electrode current collector 93. The aperture ratio of the negative electrode current collector 93 is 0%. The aperture interval P of the holes 199 is 100 μm. The aperture width W of the holes 199 is 11 μm. The number N of the holes 199 per 1 mm$^2$ is 100 holes. On both sides of the negative electrode current collector 93, the aperture ratio of the negative electrode active material layers 95 is 0.092%. The above numeral values are shown in Table 2. The numeral values in Example 10 and Comparative Example 6, which will be described later, are also shown.

discharge capacity of the lithium doped negative electrode. By this process, the negative electrode active material in the negative electrode active material layer 95 was doped with lithium, and thereby the electrode precursor 73 was made into the power storage device negative electrode 75.

After being led through the cleaning tank 7 storing EMC (ethyl methyl carbonate) at 25° C., the power storage device negative electrode 75 was wound up. The power storage device negative electrode 75 was fabricated as described above.

(5-2) Fabrication of Power Storage Device Negative Electrode of Example 10

The power storage device negative electrode of Example 10 was fabricated in basically the same manner as that in Example 9. The structure of the power storage device negative electrode 75 of Example 10 is shown in FIG. 6A and FIG. 6B. However, the difference is that the values of the aperture interval P and the depth d of the holes 199 and the value of the aperture ratio of the negative electrode active material layer 95 are those shown in Table 2 above.

TABLE 2

| | Form of holes in negative electrode active material layer | | | | Aperture ratio of negative active material layer (%) | Electrode and cell properties | | | | | |
|---|---|---|---|---|---|---|---|---|---|---|---|
| | | | | | | | Initial | | After 10000 cycles | | After 100000-cycle |
| | Presence/ absence of through holes | Aperture interval P (μm) | Aperture width (μm) | Hole depth d (μm) | | Initial discharge capacity (mAh) | Initial resistance (mΩ) | After-cycle discharge capacity (mAh) | After-cycle resistance (mΩ) | capacity maintenance rate (%) | Presence/ absence of Li precipitation |
| Example 9 | Present | 100 | 11 | 11 | 0.092 | 704 | 1.56 | 583 | 1.90 | 82.8 | A |
| Example 10 | Present | 100 | 16 | 31 | 0.550 | 705 | 1.57 | 613 | 1.81 | 86.9 | A |
| Comparative example 6 | Absent | — | — | — | 0 | 708 | 1.58 | 501 | 2.16 | 70.8 | B |

Subsequently, the lithium electrode was fabricated as follows. First, a long copper plate with a thickness of 2 mm was prepared. On the copper plate, the lithium metal plate was adhered. The dimension of the lithium metal plate is 120 mm in width×400 mm in length and 1 mm in thickness. The lithium metal plate is adhered along the longitudinal direction of the copper plate. The copper plate to which the lithium metal plate is adhered in this way is referred to as the counter electrode member 51. Four pieces of the identical counter electrode members 51 were fabricated.

The electrode manufacturing apparatus 1 shown in FIG. 1 was prepared, and the electrode precursor 73 and the counter electrode members 51 were installed. Then, the electrolyte solution was supplied into the electrode manufacturing apparatus 1. The electrolyte solution contains 1.2 M of LiPF$_6$. The solvent of the electrolyte solution is a mixed solvent containing ethylene carbonate, ethyl methyl carbonate, and dimethyl carbonate at the volume ratio of 3:4:3.

Subsequently, the electrode precursor 73 and the counter electrode members 51 installed in the electrode manufacturing apparatus 1 were connected to the direct current power sources with the current voltage monitors, and a 20 A current was applied while the electrode precursor 73 was conveyed at a speed of 9.6 m/h (0.16 m/min). The energization time was set, in consideration of the irreversible capacity, to a time within which the lithium storage ratio to the theoretical capacity of graphite became 76%. The theoretical capacity of graphite is 365 mAh/g. The irreversible capacity had been estimated in advance by measuring the (5-3) Fabrication of Power Storage Device Negative Electrode of Comparative Example 6

The power storage device negative electrode of Comparative Example 6 was fabricated in basically the same manner as that in Example 9. However, the difference is that the negative electrode active material layers 95 do not comprise the holes 199 on either side of the negative electrode current collector 93. In Comparative Example 6, the aperture ratio of the negative electrode active material layer is 0%.

(5-4) Evaluation of Power Storage Device Negative Electrode

The power storage device negative electrodes of each example and Comparative Example 6 were evaluated in terms of the initial discharge capacity, the initial resistance, the after-cycle discharge capacity, the after-cycle resistance, the after 100,000-cycle capacity maintenance rate, and the presence or absence of Li precipitation. The results are shown in Table 2 above. The method for the evaluation is as follows.

Making Cell for Evaluation

Fifteen pieces of negative electrodes in the size of 150 mm×100 mm (excluding the terminal welded portions) were cut out. Fourteen pieces of positive electrodes in the size of 150 cm×97 cm (excluding the terminal welded portions) were also cut out. The positive electrodes and the negative electrodes were alternately stacked having separators, which are made of a 16 μm thick polyethylene nonwoven fabric, interposed therebetween to make an electrode laminate. At this time, the terminal welded portions of the positive electrode current collectors and the terminal welded portions of the negative electrode current collectors were placed on opposite sides. The negative electrodes were placed in the outermost portion of the electrode laminate.

Subsequently, the separators were respectively placed in the uppermost portion and the lowermost portion of the electrode laminate, and the four sides of the electrode laminate were taped. Then, the terminal welded portion of each of the fifteen positive electrode current collectors was ultrasonic-welded to the aluminum positive terminal. The terminal welded portion of each of the fourteen negative electrode current collectors resistance-welded to the copper negative terminal.

Subsequently, the electrode laminate was placed inside of the laminate film, and the opening portion of the laminate film was covered with another laminate film. Three out of four sides of the laminate film in the opening portion was fusion-bonded. Then, following the vacuum impregnation of the inside of the laminate films with the electrolyte solution, the remaining one side of the laminate films that had been open was vacuum fusion bonded. The electrolyte solution was a solution in which $LiPF_6$ was dissolved in a mixed solvent at the concentration of 1.2 mol/L. The mixed solvent is a solvent in which EC, EMC, and DMC are mixed at a volume ratio of 3:4:3. Through the above processes, a cell for evaluation was completed.

Initial Evaluation

The cell made for evaluation was charged at a constant current of 5 A until the cell voltage became 4 V. Then, the constant current constant voltage charging, in which a constant voltage of 4 V was applied, was performed for 24 hours. After opening of the cell and vacuum impregnation with the electrolyte solution, the laminate film was vacuum-fusion bonded again. Subsequently, the cell for evaluation was charged at a constant current of 5 A until the cell voltage became 3.8 V. After the constant current constant voltage charging, in which a constant voltage of 3.8 V was applied, was performed for 15 minutes, the cell for evaluation was discharged at a constant current of 5 A until the cell voltage became 2.2 V. A cycle test in which the above-described cycle was repeated was performed, and the cell capacity at the second discharge was defined as the initial discharge capacity. A value obtained by dividing the voltage difference between the voltage immediately before the initiation of the discharge and the voltage three seconds after the initiation of the discharge by the discharged current value was calculated. This calculated value was defined as the initial resistance. The initial resistance is a direct current internal resistance of the cell.

(After 100,000-cycle Capacity Retention Rate)

Subsequently, the cell for evaluation was discharged at a constant current of 5 A until the voltage became 2.2 V. Then, the recharge and discharge cycle was repeated 100,000 cycles at the constant current of 70 A and in the voltage range between 3.8 V and 2.2 V.

Subsequently, the cell for evaluation after 100,000 cycles was charged at a constant current of 5 A until the cell voltage became 3.8 V. Then, the constant current constant voltage charging, in which a constant voltage of 3.8 V was applied, was performed for 15 minutes. Next, the cell for evaluation was discharged at a constant current of 5 A until the cell voltage became 2.2 V. A cycle test in which the above-described cycle was repeated was performed, and the cell capacity at the second discharge was defined as the after-cycle discharge capacity. A value obtained by dividing the voltage difference between the voltage immediately before the initiation of the discharge and the voltage three seconds after the initiation of the discharge by the discharged current value was calculated, and this calculated value was defined as the after-cycle resistance. The after 100,000-cycle capacity retention rate was calculated based on Formula (4) described above.

In the power storage device negative electrodes of Examples 9 and 10 and Comparative Example 6, the initial discharge capacities and the initial resistances were comparable. The after-cycle discharge capacities of the power storage device negative electrodes of Examples 9 and 10 were larger than the after-cycle discharge capacity of the power storage device negative electrode of Comparative Example 6. Consequently, the after 100,000-cycle capacity retention rates of the power storage device negative electrodes of Examples 9 and 10 were higher than the after 100,000-cycle capacity retention rate of the power storage device negative electrode of Comparative Example 6. The after-cycle resistance of the power storage device negative electrodes of Examples 9 and 10 were lower than the after-cycle resistance of the power storage device negative electrode of Comparative Example 6.

(Evaluation for Li Precipitation)

After the above-described 100,000 cycles of charging and discharging, the cell for evaluation was disassembled to remove the power storage device negative electrodes. In each of the removed power storage device negative electrodes, the area of the range in which the lithium metal had been precipitated (hereinafter referred to as lithium precipitated area) was measured.

If there was no power storage device negative electrode with the lithium precipitation area of 5% or less, the negative electrodes were rated as "A", if there was any power storage device negative electrode with the lithium precipitation area of 5% or more, the negative electrodes were rated as "B". The lithium precipitation area was obtained by Formula (5) described above.

The results of the evaluation for Li precipitation was "A" for the power storage device negative electrodes of Examples 9 and 10. On the other hand, the result of the evaluation for Li precipitation was "B" for the power storage device negative electrodes of Comparative Example 6.

Other Embodiments

Although embodiments of the present disclosure have been described above, the present disclosure is not limited to the above-described embodiments, but can be implemented in variously modified forms.

(1) The shape of the first through-holes is not particularly limited, and may be, for example, circular, polygonal, irregular, or slit-like. The first through-holes may be arranged in order, or may be randomly arranged. The shape and the size of the first through-holes may be fixed, or may be irregular.

The shape of the second through-holes is not particularly limited, and may be, for example, circular, polygonal, irregular, or slit-like. The second through-holes may be arranged in order, or may be randomly arranged. The shape and the size of the second through-holes may be fixed, or may be irregular.

In view from a thickness direction of the negative electrode, the positions of at least part of the first through-holes may differ from the positions of the second through-holes. In view from the thickness direction of the negative electrode, the positions of at least part of the second through-holes may differ from the positions of the first through-holes.

(2) Functions of one component in each of the above-described embodiments may be distributed to two or more components; a function of two or more components may be achieved by one component. One part of the configuration of each of the above-described embodiments may be omitted. At least a part of the configuration of each of the above-described embodiments may be added to or replaced with the configurations of other embodiments described above. Any mode included in the technical ideas identified by the wording in the claims are embodiments of the present disclosure.

(3) In addition to the above-described power storage device, the present disclosure can be achieved by various forms such as a system comprising the power storage device as a component.

The invention claimed is:

1. A power storage device comprising:
an electrode assembly comprising:
a positive electrode;
a separator; and
a negative electrode; and
an electrolyte solution,
wherein the negative electrode comprises:
  a negative electrode current collector; and
  a negative electrode active material layer formed on at least one side of the negative electrode current collector,
wherein the negative electrode is doped with lithium,
wherein the power storage device is formed by (i) forming holes in the negative electrode active material layer and (ii) thereafter doping the negative electrode active material layer with the lithium by electrically connecting, in an electrolyte solution tank accommodating a dope solution containing lithium ions and a solvent and a counter electrode member, an electrode precursor and the counter electrode member, the counter electrode member including a structure in which a conductive base material and a lithium metal containing plate being stacked, and the electrode precursor comprising the negative electrode current collector and the negative electrode active material layer that is not yet doped with the lithium,
wherein an aperture ratio of the negative electrode current collector is 0% or higher and 0.1% or lower,
wherein an aperture ratio of the negative electrode active material layer is 0.001% or higher and 10% or lower, and
wherein a lower limit of a depth ratio of the holes to a thickness of the negative electrode active material layer is 20% and an upper limit of the depth ratio is 90%.

2. The power storage device according to claim 1, wherein the negative electrode active material layer is formed on both sides of the negative electrode current collector, and
wherein, on both sides of the negative electrode current collector, an aperture ratio of the negative electrode active material layer is 0.001% or higher and 10% or lower.

3. The power storage device according to claim 1, wherein a depth of the holes is 1 μm or larger and 100 μm or smaller.

4. The power storage device according to claim 1, wherein an aperture interval between the holes is 10 μm or larger and 5000 μm or smaller.

5. The power storage device according to claim 1, wherein an aperture width of the holes is 0.1 μm or larger and 100 μm or smaller.

6. The power storage device according to claim 1, wherein a number of the holes per 1 mm$^2$ is 0.1 or more and 1000 or less.

7. The power storage device according to claim 1, wherein a doping amount of lithium in the negative electrode is 50 mAh or more and 5000 mAh or less per 1 g of a negative electrode active material contained in the negative electrode active material layer.

8. A power storage device negative electrode comprising:
a negative electrode current collector; and
a negative electrode active material layer formed on a surface of the negative electrode current collector,
wherein the power storage device negative electrode is doped with lithium,
wherein the power storage device negative electrode is formed by (i) forming holes in the negative electrode active material layer and (ii) thereafter doping the negative electrode active material layer with the lithium by electrically connecting, in an electrolyte solution tank accommodating a dope solution containing lithium ions and a solvent and a counter electrode member, an electrode precursor and the counter electrode member, the counter electrode member including a structure in which a conductive base material and a lithium metal containing plate being stacked, and the electrode precursor comprising the negative electrode current collector and the negative electrode active material layer that is not yet doped with the lithium,
wherein an aperture ratio of the negative electrode current collector is 0% or higher and 0.1% or lower,
wherein an aperture ratio of the negative electrode active material layer is 0.001% or higher and 1% or lower, and
wherein a lower limit of a depth ratio of the holes to a thickness of the negative electrode active material layer is 20% and an upper limit of the depth ratio is 90%.

* * * * *